United States Patent
Yang et al.

(10) Patent No.: US 10,764,183 B2
(45) Date of Patent: *Sep. 1, 2020

(54) DATA FLOW TRANSMISSION METHOD, DEVICE, AND SYSTEM

(71) Applicant: Huawei Technologies Co., Ltd., Shenzhen (CN)

(72) Inventors: Yanmei Yang, Beijing (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,464

(22) Filed: Apr. 23, 2019

(65) Prior Publication Data

US 2019/0253353 A1 Aug. 15, 2019

Related U.S. Application Data

(63) Continuation of application No. 15/653,247, filed on Jul. 18, 2017, now Pat. No. 10,313,242, which is a
(Continued)

(51) Int. Cl.
*H04L 12/801* (2013.01)
*H04W 88/04* (2009.01)
(Continued)

(52) U.S. Cl.
CPC .......... *H04L 47/10* (2013.01); *H04L 61/2069* (2013.01); *H04W 4/06* (2013.01);
(Continued)

(58) Field of Classification Search
CPC combination set(s) only.
See application file for complete search history.

(56) References Cited

U.S. PATENT DOCUMENTS

| 2013/0016649 A1* | 1/2013 | Dannnjanovic ....... H04W 88/04 370/315 |
| 2014/0126454 A1* | 5/2014 | Zhang ................... H04W 4/06 370/312 |

(Continued)

FOREIGN PATENT DOCUMENTS

| CN | 101998668 A | 3/2011 |
| CN | 103476140 A | 12/2013 |

(Continued)

OTHER PUBLICATIONS

"3rd Generation Partnership Project; Technical Specification Group Services and Systems Aspects; Study on architecture enhancements to support Proximity-based Services (ProSe) (Release 12)," 3GPP TR 23.703 V12.0.0, pp. 1-324, 3rd Generation Partnership Project, Valbonne, France (Feb. 2014).

*Primary Examiner* — Yuwen Pan
*Assistant Examiner* — Erica L Fleming-Hall
(74) *Attorney, Agent, or Firm* — Leydig, Voit & Mayern Ltd.

(57) ABSTRACT

A data flow transmission method, a device, and a system relating to the communications field, are provided, so as to resolve a problem of resource waste caused when a relay user equipment provides a relay service for a remote user equipment. A specific solution is as follows: A first network device triggers a first relay user equipment to establish a common data flow bearer with a second network device, and the first network device sends an identifier of a common data flow to a remote user equipment in a first group before or after the first network device triggers the first relay user equipment to establish the common data flow bearer with the second network device. Embodiments of the present invention are applied to data flow transmission.

9 Claims, 7 Drawing Sheets

Related U.S. Application Data continuation of application No. PCT/CN2015/071041, filed on Jan. 19, 2015.

(51) Int. Cl.
*H04L 29/12* (2006.01)
*H04W 4/06* (2009.01)

(52) U.S. Cl.
CPC ............ *H04W 88/04* (2013.01); *H04L 47/12* (2013.01); *H04L 47/29* (2013.01)

(56) References Cited

U.S. PATENT DOCUMENTS

| | | | | |
|---|---|---|---|---|
| 2015/0036579 A1* | 2/2015 | Wu | ................... | H04B 7/15 370/312 |
| 2016/0234806 A1* | 8/2016 | Le Thierry D'Ennequin | ............. | H04W 4/06 |
| 2016/0381491 A1* | 12/2016 | Watfa | ................... | H04W 76/14 455/41.2 |
| 2017/0071028 A1* | 3/2017 | Kuo | ................... | H04W 76/32 |
| 2017/0171060 A1* | 6/2017 | Liu | ................... | H04L 5/0007 |
| 2017/0289984 A1* | 10/2017 | Baligh | ................... | H04L 5/0094 |
| 2018/0048986 A1 | 2/2018 | Adachi | | |
| 2018/0091964 A1 | 3/2018 | Adachi | | |
| 2018/0110094 A1 | 4/2018 | Fukuta | | |
| 2018/0191516 A1* | 7/2018 | Wolfner | ................... | H04W 8/005 |
| 2018/0192433 A1* | 7/2018 | Ouyang | ................... | H04W 72/1242 |
| 2018/0234808 A1* | 8/2018 | Adachi | ................... | H04W 4/06 |

FOREIGN PATENT DOCUMENTS

| | | |
|---|---|---|
| CN | 103684715 A | 3/2014 |
| CN | 104284298 A | 1/2015 |
| CN | 104284299 A | 1/2015 |
| WO | 2010027215 A2 | 3/2010 |
| WO | 2014179960 A1 | 11/2014 |

* cited by examiner

DATA FLOW TRANSMISSION METHOD, DEVICE, AND SYSTEM

CROSS-REFERENCE TO RELATED APPLICATIONS

This application is a continuation of U.S. application Ser. No. 15/653,247, filed on Jul. 18, 2017, which is a continuation of International Application No. PCT/CN2015/071041, filed on Jan. 19, 2015. All of the afore-mentioned patent applications are hereby incorporated by reference in their entireties.

TECHNICAL FIELD

Embodiments of the present invention relate to the communications field, and in particular, to a data flow transmission method, a device, and a system.

BACKGROUND

In a wireless communications network, when a user equipment is located in network coverage, the user equipment may directly establish a connection to and communicate with a network side. However, when the user equipment is located outside the network coverage, the user equipment cannot directly establish a connection to the network side. The user equipment located outside the network coverage may be referred to as a remote user equipment. In the prior art, the remote user equipment may establish a connection to the network side by using a relay user equipment located in the network coverage.

Specifically, the remote user equipment may transmit data to the network side by using the relay user equipment in a unicast transmission manner or a multicast transmission manner. In a unicast transmission manner, a relay user equipment may provide services for multiple remote user equipments. When content of data sent by the multiple remote user equipments is the same, same data is repeatedly transmitted multiple times between the relay user equipment and a network side, thereby causing resource waste. In a multicast transmission manner, multiple relay user equipments provide relay services. However, if there are few relay user equipments, that is, there are few user equipments that are directly connected to a base station, in this case, if the base station still transmits data in a multicast mode, only the few relay user equipments directly receive data from a network in actuality, and a remote user equipment still needs to obtain data by using a relay user equipment. When the base station transmits data in a multicast mode, signal strength needs to ensure that farthest user equipment in coverage can receive data. Therefore, an effect of broadcast transmission in which the base station transmits data by using relatively large power is actually similar to that of unicast transmission, thereby increasing power consumption of the base station, and causing resource waste.

SUMMARY

Embodiments of the present invention provide a data flow transmission method, a device, and a system, so as to resolve a problem of resource waste caused when a relay user equipment provides a relay service for a remote user equipment.

To achieve the foregoing objective, the embodiments of the present invention use the following technical solutions.

According to a first aspect, a data flow transmission method is provided, is applied to a wireless network system, and includes:

triggering, by a first network device, a first relay user equipment to establish a common data flow bearer with a second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and sending, by the first network device, an identifier of a common data flow to the a remote user equipment in the first group by using the first relay user equipment, where the identifier of the common data flow is used to instruct the remote user equipment in the first group to receive data of the common data flow.

With reference to the first aspect, in a first possible implementation of the first aspect, before the triggering, by a first network device, a first relay user equipment to establish a common data flow bearer with a second network device, the method further includes:

obtaining, by the first network device, position information of a user equipment for which the first network device provides a service;

determining, by the first network device, a quantity of user equipments in wireless network coverage according to the position information of the user equipment for which the first network device provides a service; and if the quantity of user equipments in the wireless network coverage is greater than or equal to a first threshold, triggering, by the first network device, the first relay user equipment to establish a multimedia broadcast/multicast service MBMS bearer with the second network device, and sending a TMGI to the first relay user equipment.

With reference to the first possible implementation of the first aspect, in a second possible implementation of the first aspect, the method further includes:

if the quantity of user equipments in the wireless network coverage is less than the first threshold, determining, by the first network device according to the position information of the user equipment for which the first network device provides a service, a quantity of remote user equipments connected to the first relay user equipment; and the triggering, by a first network device, a first relay user equipment to establish a common data flow bearer with a second network device includes:

when the quantity of remote user equipments connected to the first relay user equipment is greater than or equal to a second threshold, triggering, by the first network device, the first relay user equipment to establish the common data flow bearer with the second network device.

With reference to the first possible implementation of the first aspect or the second possible implementation of the first aspect, in a third possible implementation of the first aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment, where i is an integer greater than or equal to 1.

With reference to any one of the first aspect, or the first to the third possible implementations of the first aspect, in a fourth possible implementation of the first aspect, before the sending, by the first network device, an identifier of a common data flow to the remote user equipment in the first group, the method further includes:

receiving, by the first network device, the identifier of the common data flow sent by the first relay user equipment.

With reference to any one of the first aspect, or the first to the fourth possible implementations of the first aspect, in a fifth possible implementation of the first aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to a second aspect, a data flow transmission method is provided, is applied to a wireless network system, and includes:

when a first network device triggers a first relay user equipment to establish a common data flow bearer with a second network device, establishing, by the first relay user equipment, the common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and obtaining, by the first relay user equipment, an identifier of a common data flow before or after the first relay user equipment establishes the common data flow bearer with the second network device, where the identifier of the common data flow is used to instruct the first relay user equipment to send data of the common data flow to the remote user equipment in the first group.

With reference to the second aspect, in a first possible implementation of the second aspect, before the establishing, by the first relay user equipment, the common data flow bearer with the second network device, the method further includes:

sending, by the first relay user equipment, position information of the remote user equipment to the remote user equipment, where the remote user equipment is connected to the second network device by using the first relay user equipment.

With reference to the first possible implementation of the second aspect, in a second possible implementation of the second aspect, position information of $n^{th}$ remote user equipment in the remote user equipments includes at least one of a cell identity ID of a cell to which the first relay user equipment belongs, a data link layer ID of the first relay user equipment, or an Internet Protocol IP address of the $n^{th}$ remote user equipment, where n is an integer greater than or equal to 1.

With reference to the second aspect, in a third possible implementation of the second aspect, the method further includes:

when the first network device triggers the first relay user equipment to establish a multimedia broadcast/multicast service MBMS bearer with the second network device, establishing, by the first relay user equipment, the MBMS bearer with the second network device, and receiving a TMGI sent by the first network device.

With reference to any one of the second aspect, or the first to the third possible implementations of the second aspect, in a fourth possible implementation of the second aspect, the obtaining, by the first relay user equipment, an identifier of a common data flow includes:

obtaining, by the first relay user equipment, the identifier of the common data flow sent by the remote user equipment in the first group.

With reference to any one of the second aspect, or the first to the third possible implementations of the second aspect, in a fifth possible implementation of the second aspect, the method further includes:

sending, by the first relay user equipment, the identifier of the common data flow to the first network device.

With reference to any one of the second aspect, or the first to the fifth possible implementations of the second aspect, in a sixth possible implementation of the second aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to a third aspect, a data flow transmission method is provided, is applied to a wireless network system, and includes:

obtaining, by the first network device, position information of a user equipment for which the first network device provides a service; and triggering, by the first network device when determining, according to the position information of the user equipment for which the first network device provides a service, that the user equipment for which the first network device provides a service meets a multimedia broadcast/multicast service MBMS transmission condition, the first relay user equipment to establish an MBMS bearer with the second network device.

With reference to the third aspect, in a first possible implementation of the third aspect, the triggering, by the first network device when determining, according to the position information of the user equipment for which the first network device provides a service, that the user equipment for which the first network device provides a service meets a multimedia broadcast/multicast service MBMS transmission condition, the first relay user equipment to establish an MBMS bearer with the second network device includes:

determining, by the first network device, a quantity of user equipments in wireless network coverage according to the position information of the user equipment for which the first network device provides a service; and if the quantity of user equipments in the wireless network coverage is greater than or equal to a first threshold, triggering, by the first network device, the first relay user equipment to establish the MBMS bearer with the second network device.

With reference to the third aspect, in a second possible implementation of the third aspect, the method further includes:

when the first network device determines, according to the position information of the user equipment for which the first network device provides a service, that the user equipment for which the first network device provides a service does not meet the multimedia broadcast/multicast service MBMS transmission condition, triggering, by the first network device, the first relay user equipment to establish a common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

With reference to the second possible implementation of the third aspect, in a third possible implementation of the third aspect, the method further includes:

sending, by the first network device, an identifier of a common data flow to the remote user equipment in the first group when the first network device determines, according to the position information of the user equipment for which the first network device provides a service, that the user equipment for which the first network device provides a service does not meet the multimedia broadcast/multicast service MBMS transmission condition, where the identifier of the common data flow is used to instruct the remote user equipment in the first group to receive the common data flow.

With reference to the third possible implementation of the third aspect, in a fourth possible implementation of the third aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

With reference to any one of the third aspect, or the first to the fourth possible implementations of the third aspect, in a fifth possible implementation of the third aspect, after the triggering, by the first network device, the first relay user equipment to establish a multimedia broadcast/multicast service MBMS bearer with the second network device, the method further includes:

sending, by the first network device, a TMGI to the first relay user equipment.

With reference to any one of the third aspect, or the first to the fifth possible implementations of the third aspect, in a sixth possible implementation of the third aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment.

According to a fourth aspect, a first network device is provided, is applied to a wireless network system, and includes:

a data flow unit, configured to trigger a first relay user equipment to establish a common data flow bearer with a second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and a sending unit, configured to send an identifier of a common data flow to the remote user equipment in the first group by using the first relay user equipment, where the identifier of the common data flow is used to instruct the remote user equipment in the first group to receive data of the common data flow.

With reference to the fourth aspect, in a first possible implementation of the fourth aspect, the first network device further includes an obtaining unit, configured to obtain position information of a user equipment for which the first network device provides a service;

the data flow unit is further configured to: determine a quantity of user equipments in wireless network coverage according to the position information that is of the user equipment for which the first network device provides a service and that is obtained by the obtaining unit, and if the quantity of user equipments in the wireless network coverage is greater than or equal to a first threshold, trigger the first relay user equipment to establish a multimedia broadcast/multicast service MBMS bearer with the second network device; and the sending unit is further configured to send a TMGI to the first relay user equipment.

With reference to the first possible implementation of the fourth aspect, in a second possible implementation of the fourth aspect, the data flow unit is further configured to: when the quantity of user equipments in the wireless network coverage is less than the first threshold, determine, according to the position information of the user equipment for which the first network device provides a service, a quantity of remote user equipments connected to the first relay user equipment, and when the quantity of remote user equipments connected to the first relay user equipment is greater than or equal to a second threshold, trigger the first relay user equipment to establish the common data flow bearer with the second network device.

With reference to the first possible implementation of the fourth aspect or the second possible implementation of the fourth aspect, in a third possible implementation of the fourth aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment, where i is an integer greater than or equal to 1.

With reference to any one of the fourth aspect, or the first to the third possible implementations of the fourth aspect, in a fourth possible implementation of the fourth aspect, the first network device further includes a receiving unit, configured to receive the identifier of the common data flow sent by the first relay user equipment.

With reference to any one of the fourth aspect, or the first to the fourth possible implementations of the fourth aspect, in a fifth possible implementation of the fourth aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to a fifth aspect, a first relay user equipment is provided, including:

a bearer unit, configured to: when a first network device triggers the first relay user equipment to establish a common data flow bearer with a second network device, establish the common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and an obtaining unit, configured to obtain an identifier of a common data flow before or after the first relay user equipment establishes the common data flow bearer with the second network device, where the identifier of the common data flow is used to instruct the first relay user equipment to send data of the common data flow to the remote user equipment in the first group.

With reference to the fifth aspect, in a first possible implementation of the fifth aspect, the first relay user equipment further includes a first sending unit, configured to send position information of the remote user equipment to the remote user equipment, where the remote user equipment is connected to the second network device by using the first relay user equipment.

With reference to the first possible implementation of the fifth aspect, in a second possible implementation of the fifth aspect, position information of $n^{th}$ remote user equipment in the remote user equipments includes at least one of a cell identity ID of a cell to which the first relay user equipment belongs, a data link layer ID of the first relay user equipment, or an Internet Protocol IP address of the $n^{th}$ remote user equipment, where n is an integer greater than or equal to 1.

With reference to the fifth aspect, in a third possible implementation of the fifth aspect, the bearer unit is further configured to: when the first network device triggers the first relay user equipment to establish a multimedia broadcast/multicast service MBMS bearer with the second network device, establish the MBMS bearer with the second network device; and the first relay user equipment further includes a receiving unit, configured to receive a TMGI sent by the first network device.

With reference to any one of the fifth aspect, or the first to the third possible implementations of the fifth aspect, in a fourth possible implementation of the fifth aspect, the obtaining unit is specifically configured to obtain the identifier of the common data flow sent by the remote user equipment in the first group.

With reference to any one of the fifth aspect, or the first to the third possible implementations of the fifth aspect, in a fifth possible implementation of the fifth aspect, the first relay user equipment further includes a second sending unit, configured to send the identifier of the common data flow to the first network device.

With reference to any one of the fifth aspect, or the first to the fifth possible implementations of the fifth aspect, in a sixth possible implementation of the fifth aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to a sixth aspect, a first network device is provided, is applied to a wireless network system, and includes:

an obtaining unit, configured to obtain position information of a user equipment for which the first network device provides a service; and a data flow unit, configured to: when it is determined, according to the position information that is of the user equipment for which the first network device provides a service and that is obtained by the obtaining unit, that the user equipment for which the first network device provides a service meets a multimedia broadcast/multicast service MBMS transmission condition, trigger the first relay user equipment to establish an MBMS bearer with the second network device.

With reference to the sixth aspect, in a first possible implementation of the sixth aspect, the data flow unit is specifically configured to: determine a quantity of user equipments in wireless network coverage according to the position information of the user equipment for which the first network device provides a service, and if the quantity of user equipments in the wireless network coverage is greater than or equal to a first threshold, trigger the first relay user equipment to establish the MBMS bearer with the second network device.

With reference to the sixth aspect, in a second possible implementation of the sixth aspect, the data flow unit is further configured to: when it is determined, according to the position information of the user equipment for which the first network device provides a service, that the user equipment for which the first network device provides a service does not meet the multimedia broadcast/multicast service MBMS transmission condition, trigger the first relay user equipment to establish a common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

With reference to the second possible implementation of the sixth aspect, in a third possible implementation of the sixth aspect, the first network device further includes a first sending unit, configured to send an identifier of a common data flow to the remote user equipment in the first group when it is determined, according to the position information of the user equipment for which the first network device provides a service, that the user equipment for which the first network device provides a service does not meet the multimedia broadcast/multicast service MBMS transmission condition, where the identifier of the common data flow is used to instruct the remote user equipment in the first group to receive the common data flow.

With reference to the third possible implementation of the sixth aspect, in a fourth possible implementation of the sixth aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

With reference to any one of the sixth aspect, or the first to the fourth possible implementations of the sixth aspect, in a fifth possible implementation of the sixth aspect, the first network device further includes a second sending unit, configured to send a TMGI to the first relay user equipment.

With reference to any one of the sixth aspect, or the first to the fifth possible implementations of the sixth aspect, in a sixth possible implementation of the sixth aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment.

According to a seventh aspect, a first network device is provided, including: a processor, a memory, a bus, and a transmitter, where the processor, the memory, and the transmitter are connected to each other by using the bus;

the processor is configured to trigger a first relay user equipment to establish a common data flow bearer with a second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and the transmitter is configured to send an identifier of a common data flow to the remote user equipment in the first group by using the first relay user equipment, where the identifier of the common data flow is used to instruct the remote user equipment in the first group to receive data of a common data flow.

With reference to the seventh aspect, in a first possible implementation of the seventh aspect, the processor is further configured to: obtain position information of a user equipment for which the first network device provides a service, determine a quantity of user equipments in wireless network coverage according to the position information of the user equipment for which the first network device provides a service, and if the quantity of user equipments in the wireless network coverage is greater than or equal to a first threshold, trigger the first relay user equipment to establish a multimedia broadcast/multicast service MBMS bearer with the second network device; and the transmitter is further configured to send a TMGI to the first relay user equipment.

With reference to the first possible implementation of the seventh aspect, in a second possible implementation of the seventh aspect, the processor is further configured to: when the quantity of user equipments in the wireless network coverage is less than the first threshold, determine, according to the position information of the user equipment for which the first network device provides a service, a quantity of remote user equipments connected to the first relay user equipment, and when the quantity of remote user equipments connected to the first relay user equipment is greater than or equal to a second threshold, trigger the first relay user equipment to establish the common data flow bearer with the second network device.

With reference to the first possible implementation of the seventh aspect or the second possible implementation of the seventh aspect, in a third possible implementation of the seventh aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment, where i is an integer greater than or equal to 1.

With reference to any one of the seventh aspect, or the first to the third possible implementations of the seventh aspect, in a fourth possible implementation of the seventh aspect, the first network device further includes a receiver, configured to receive the identifier of the common data flow sent by the first relay user equipment.

With reference to any one of the seventh aspect, or the first to the fourth possible implementations of the seventh aspect, in a fifth possible implementation of the seventh aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to an eighth aspect, a first relay user equipment is provided, including: a processor, a memory, and a bus, where the processor and the memory are connected to each other by using the bus;

the processor is configured to: when a first network device triggers the first relay user equipment to establish a common data flow bearer with a second network device, establish the common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments; and the processor is further configured to obtain an identifier of a common data flow before or after the first relay user equipment establishes the common data flow bearer with the second network device, where the identifier of the common data flow is used to instruct the first relay user equipment to send data of the common data flow to the remote user equipment in the first group.

With reference to the eighth aspect, in a first possible implementation of the eighth aspect, the first relay user equipment further includes a first transmitter, configured to send position information of the remote user equipment to the remote user equipment, where the remote user equipment is connected to the second network device by using the first relay user equipment.

With reference to the first possible implementation of the eighth aspect, in a second possible implementation of the eighth aspect, position information of $n^{th}$ remote user equipment in the remote user equipments includes at least one of a cell identity ID of a cell to which the first relay user equipment belongs, a data link layer ID of the first relay user equipment, or an Internet Protocol IP address of the $n^{th}$ remote user equipment, where n is an integer greater than or equal to 1.

With reference to the eighth aspect, in a third possible implementation of the eighth aspect, the processor is further configured to: when the first network device triggers the first relay user equipment to establish a multimedia broadcast/multicast service MBMS bearer with the second network device, establish the MBMS bearer with the second network device;

and the first relay user equipment further includes a receiver, configured to receive a TMGI sent by the first network device.

With reference to any one of the eighth aspect, or the first to the third possible implementations of the eighth aspect, in a fourth possible implementation of the eighth aspect, the processor is specifically configured to obtain the identifier of the common data flow sent by the remote user equipment in the first group.

With reference to any one of the eighth aspect, or the first to the third possible implementations of the eighth aspect, in a fifth possible implementation of the eighth aspect, the first relay user equipment further includes a second transmitter, configured to send the identifier of the common data flow to the first network device.

With reference to any one of the eighth aspect, or the first to the fifth possible implementations of the eighth aspect, in a sixth possible implementation of the eighth aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

According to a ninth aspect, a first network device is provided, including: a processor, a memory, and a bus, where the processor and the memory are connected to each other by using the bus;

the processor is configured to: obtain position information of a user equipment for which the first network device provides a service, and when it is determined, according to the position information of the user equipment for which the first network device provides a service, that the user equipment for which the first network device provides a service meets a multimedia broadcast/multicast service MBMS transmission condition, trigger the first relay user equipment to establish an MBMS bearer with the second network device.

With reference to the ninth aspect, in a first possible implementation of the ninth aspect, the processor is specifically configured to: determine a quantity of user equipments in wireless network coverage according to the position information of the user equipment for which the first network device provides a service, and if the quantity of user equipments in the wireless network coverage is greater than or equal to a first threshold, trigger the first relay user equipment to establish the MBMS bearer with the second network device.

With reference to the ninth aspect, in a second possible implementation of the ninth aspect, the processor is further configured to: when it is determined, according to the position information of the user equipment for which the first network device provides a service, that the user equipment for which the first network device provides a service does not meet the multimedia broadcast/multicast service MBMS transmission condition, trigger the first relay user equipment to establish a common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

With reference to the second possible implementation of the ninth aspect, in a third possible implementation of the ninth aspect, the first network device further includes a first transmitter, configured to send an identifier of a common data flow to the remote user equipment in the first group when it is determined, according to the position information of the user equipment for which the first network device provides a service, that the user equipment for which the first network device provides a service does not meet the multimedia broadcast/multicast service MBMS transmission condition, where the identifier of the common data flow is used to instruct the remote user equipment in the first group to receive the common data flow.

With reference to the third possible implementation of the ninth aspect, in a fourth possible implementation of the ninth aspect, the identifier of the common data flow includes an IP address of a downlink data receive end; and the identifier of the common data flow further includes at least one of a source IP address of the common data flow, a destination IP address of the common data flow, a protocol number of the common data flow, a source port of the common data flow, a destination port of the common data flow, or an ID of the common data flow.

With reference to any one of the ninth aspect, or the first to the fourth possible implementations of the ninth aspect, in a fifth possible implementation of the ninth aspect, the first network device further includes a second transmitter, configured to send a TMGI to the first relay user equipment.

With reference to any one of the ninth aspect, or the first to the fifth possible implementations of the ninth aspect, in a sixth possible implementation of the ninth aspect, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment.

According to a tenth aspect, a wireless network system is provided, including a first network device and a first relay user equipment, where the first network device is the first network device in the fourth aspect or any possible implementation of the fourth aspect, and the first relay user equipment is the first relay user equipment in the fifth aspect or any possible implementation of the fifth aspect; or the first network device is the first network device in the seventh aspect or any possible implementation of the seventh aspect, and the first relay user equipment is the first relay user equipment in the eighth aspect or any possible implementation of the eighth aspect.

According to an eleventh aspect, a wireless network system is provided, including a first network device, where the first network device is the first network device in the sixth aspect or any possible implementation of the sixth aspect; or the first network device is the first network device in the ninth aspect or any possible implementation of the ninth aspect.

According to the data flow transmission method, the device, and the system provided in the embodiments of the present invention, a first network device triggers a first relay user equipment to establish a common data flow bearer with a second network device; the first network device sends an identifier of a common data flow to a remote user equipment in a first group before or after the first network device triggers the first relay user equipment to establish the common data flow bearer with the second network device; and when downlink data is being transmitted, the second network device transmits data of a common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figures 1, 2:
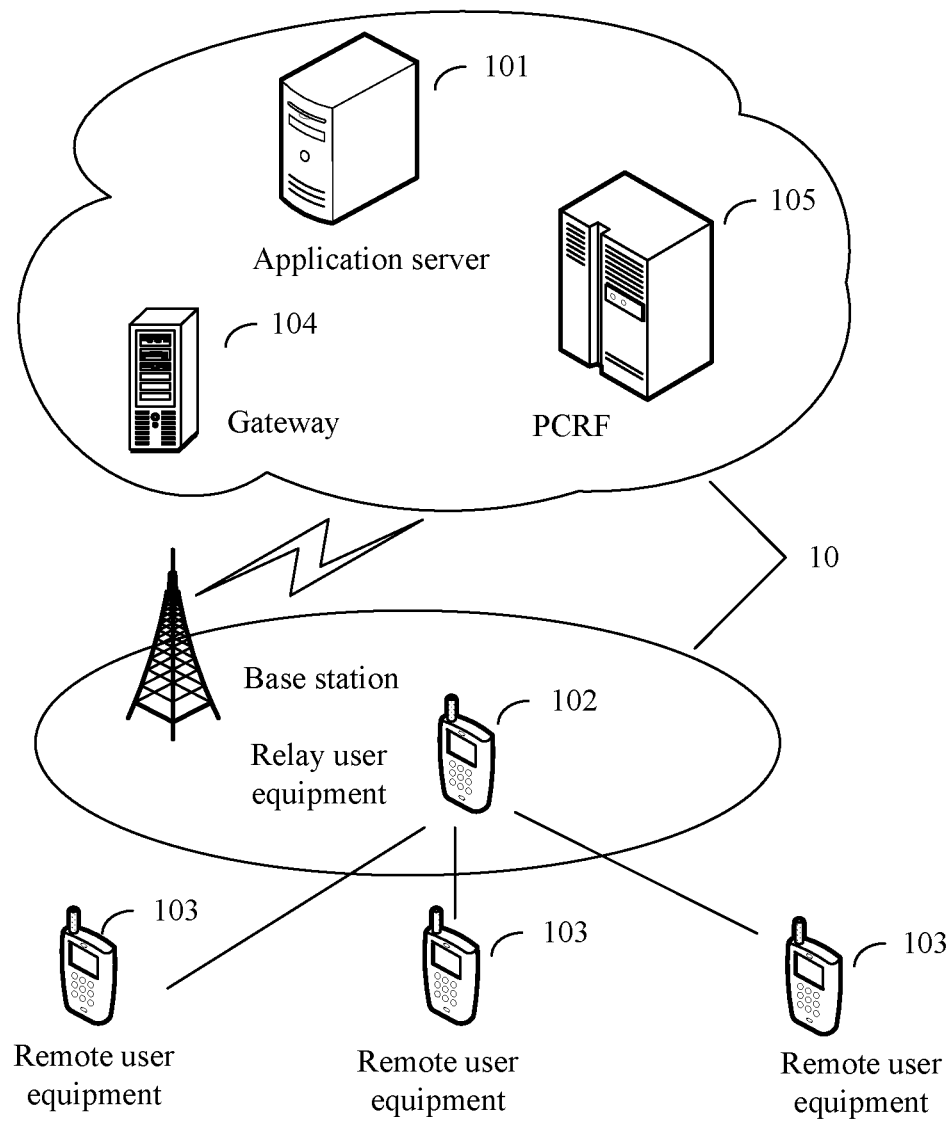
FIG. 1 is a schematic structural diagram of a wireless network system according to an embodiment of the present invention.
FIG. 2 is a schematic flowchart of a data flow transmission method according to an embodiment of the present invention.

An embodiment of the present invention provides a wireless network system 10. Referring to FIG. 1, the wireless network system 10 includes an AS (Application Server) 101, a relay user equipment 102, and a remote user equipment 103. Optionally, the wireless network system 10 may further include a GW (Gate Way) 104 and a PCRF (Policy And Charging Rules Function) 105. Preferably, the wireless network system 10 may belong to an LTE (Long Term Evolution) system, the AS 101 may be an MCPTT (Mission Critical push to talk over LTE) AS, and the GW 104 may be a PDN (Public Data Network) GW.

An embodiment of the present invention provides a data flow transmission method. The method is applied to a first network device in a wireless network system, and is preferably applied to the wireless network system shown in FIG. 1. The first network device may be the AS 101 in the wireless network system shown in FIG. 1. Referring to FIG. 2, the data flow transmission method includes the following steps.

201. The first network device triggers a first relay user equipment to establish a common data flow bearer with a second network device.

The common data flow bearer is used to carry a data flow transmitted from the second network device to a remote user equipment in a first group, and the remote user equipment in the first group is connected to the second network device by using the first relay user equipment. Data carried on the common data flow bearer is downlink data sent by the first network device to the remote user equipment in the first group, that is, all remote user equipments in the first group share the data sent on the common data flow bearer, and need to obtain the downlink data from the first relay user equipment. It should be noted that user of the first relay user equipment may be a member in the first group.

Specifically, optionally, the remote user equipment in the first group may be user equipment that participates in a group call, may be a member in a pre-configured group, or may be a member in an ad-hoc group call.

Optionally, the method is applied to the wireless network system 10 shown in FIG. 1. The first relay user equipment may be the relay user equipment 102 in the wireless network system shown in FIG. 1, the remote user equipment in the first group may be the remote user equipment 103, and the second network device may be the GW 104.

202. The first network device sends an identifier of a common data flow to a remote user equipment in a first group by using the first relay user equipment.

The first group includes at least two remote user equipments. Specifically, the first network device sends the identifier of the common data flow to the remote user equipment in the first group by using the first relay user equipment before or after the first network device triggers the first relay user equipment to establish the common data flow bearer with the second network device. The identifier of the common data flow is used to instruct the remote user equipment in the first group to receive data of the common data flow.

Optionally, the identifier of the common data flow includes an IP address of a downlink data receive end, and may further include one or more of a source IP address of the common data flow, a transmit end IP address of the common data flow, a destination IP address of the common data flow, a protocol number of the common data flow, a source port of the common data flow, or a destination port of the common data flow.

In addition, optionally, a common data flow identity (flow ID) may be further used for identifying. Preferably, in an LTE system, the common data flow identity (flow ID) is an identity that is pre-negotiated by the first network device and an EPC (Evolved Packet Core) and that is dedicatedly used for identifying a downlink common data flow bearer.

Optionally, the identifier of the common data flow may be determined by the first relay user equipment, may be determined by the first network device, or may be negotiated by the first network device and the remote user equipment.

In this way, when receiving, by using the common data flow bearer, data sent by the second network device, the first relay user equipment sends the data to the remote user equipment in the first group. In this case, unlike the prior art in which data for different remote user equipments is separately transmitted between the first relay user equipment and the second network device, only one piece of data is transmitted between the first relay user equipment and the second network device, and this piece of data is sent to multiple remote user equipments, thereby reducing resources for data transmission between the first relay user equipment and the second network device.

According to the data flow transmission method provided in this embodiment of the present invention, a first network device triggers a first relay user equipment to establish a common data flow bearer with a second network device; the first network device sends an identifier of a common data flow to a remote user equipment in a first group before or after the first network device triggers the first relay user equipment to establish the common data flow bearer with the second network device; and when downlink data is being transmitted, the second network device transmits data of a common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

Figure 3:
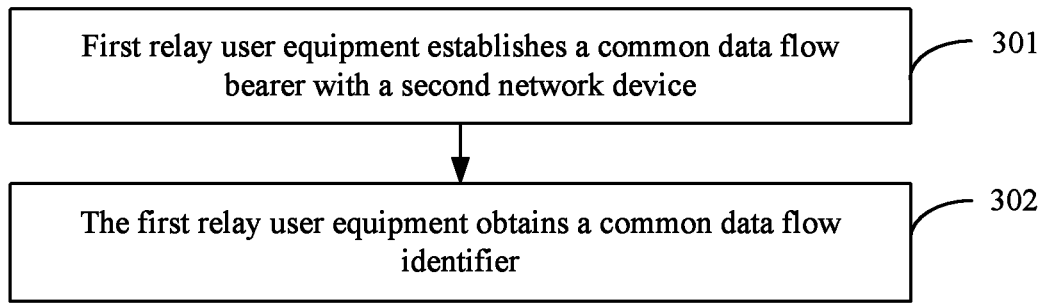
FIG. 3 is a schematic flowchart of a data flow transmission method according to another embodiment of the present invention.

With reference to the embodiment corresponding to FIG. 2, another embodiment of the present invention provides a data flow transmission method. The method is applied to a first relay user equipment in a wireless network system, and is preferably applied to the wireless network system shown in FIG. 1. The first relay user equipment may be the relay user equipment 102 in the wireless network system shown in FIG. 1. Referring to FIG. 3, the data flow transmission method includes the following steps.

301. The first relay user equipment establishes a common data flow bearer with a second network device.

Specifically, when a first network device triggers the first relay user equipment to establish the common data flow bearer with the second network device, the first relay user equipment establishes the common data flow bearer with the second network device.

The common data flow bearer is used to carry a data flow transmitted from the second network device to a remote user equipment in a first group, and the remote user equipment in the first group is connected to the second network device by using the first relay user equipment. Data carried on the common data flow bearer is downlink data sent by the first network device to the remote user equipment in the first group, that is, all remote user equipments in the first group share the data sent on the common data flow bearer, and need to obtain the downlink data from the first relay user equipment. It should be noted that the first relay user equipment may be a member in the first group.

302. The first relay user equipment obtains an identifier of a common data flow.

Specifically, the first relay user equipment obtains the identifier of the common data flow before or after the first relay user equipment establishes the common data flow bearer with the second network device. The identifier of the common data flow is used to instruct the first relay user equipment to send, to the remote user equipment in the first group, common data transmitted on the common data flow bearer. The first group includes at least two remote user equipments.

Preferably, an implementation in which the first relay user obtains the identifier of the common data flow may be: the remote user equipment in the first group sends the identifier of the common data flow to the first relay user equipment, so that the first relay user equipment subsequently sends, in a multicast manner or a unicast manner, data received on the common data flow to the remote user equipment in the first group.

Optionally, the first relay user equipment may directly capture information exchanged between the first network device and the remote user equipment in the first group, and then determine which user in remote user equipments in the first group needs to receive a data flow corresponding to the identifier of the common data flow.

Optionally, the first relay user equipment directly receives an instruction including the identifier of the common data flow from the first network device, and the instruction requires the first relay user equipment to subsequently broadcast data corresponding to the identifier of the common data flow.

Optionally, the identifier of the common data flow includes an IP address of a downlink data receive end, and may further include one or more of a source IP address of the common data flow, a transmit end IP address of the common data flow, a destination IP address of the common data flow, a protocol number of the common data flow, a source port of the common data flow, or a destination port of the common data flow.

In addition, optionally, a common data flow identity (flow ID) may be further used for identifying. Preferably, in an LTE system, the common data flow identity (flow ID) is an identity that is pre-negotiated by the first network device and an EPC (Evolved Packet Core) and that is dedicatedly used for identifying a downlink common data flow bearer.

In this way, according to step 301 and step 302, when receiving, by using the common data flow bearer, data sent by the second network device, the first relay user equipment sends the data to the remote user equipment in the first group. In this case, unlike the prior art in which data for different remote user equipments is separately transmitted between the first relay user equipment and the second network device, only one piece of data is transmitted between the first relay user equipment and the second network device, and this piece of data is sent to multiple remote user equipments, thereby reducing resources for data transmission between the first relay user equipment and the second network device.

According to the data flow transmission method provided in this embodiment of the present invention, a first relay user equipment establishes a common data flow bearer with a second network device; the first relay user equipment obtains an identifier of a common data flow before or after the first relay user equipment establishes the common data flow bearer with the second network device; and when downlink data is being transmitted, the second network device transmits data of the common data flow to the first relay user equipment, and the first relay user equipment transmits the data of the common data flow to a remote user equipment in a first group. In this way, common data sent to multiple remote user equipments is transmitted only once between the first relay user equipment and the second network device, thereby resolving a problem of resource waste caused when a relay user equipment provides a relay service for a remote user equipment.

Figure 4:
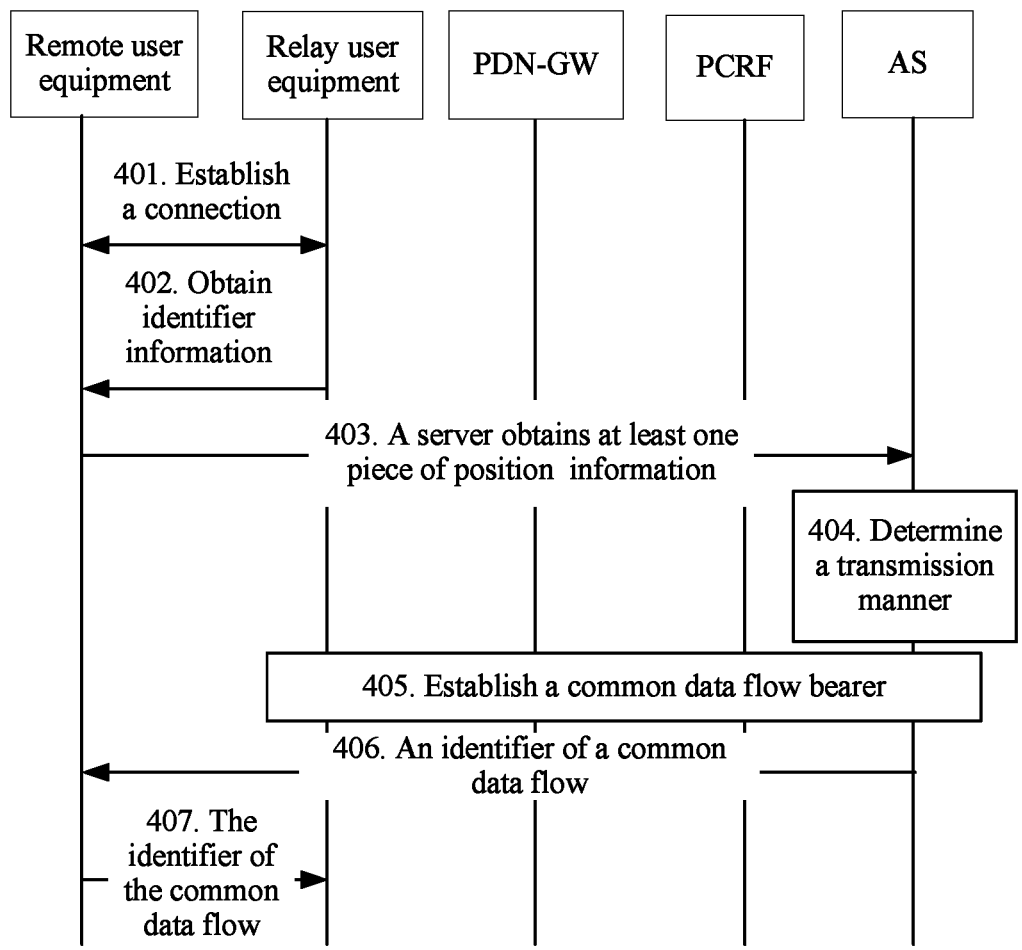
FIG. 4 is a schematic interaction diagram of a data flow transmission method according to still another embodiment of the present invention.

Based on the embodiments corresponding to FIG. 1, FIG. 2, and FIG. 3, still another embodiment of the present invention provides a data flow transmission method. The method is applied to a wireless network system, and involves a first network device, a first relay user equipment, at least one remote user equipment, and a second network device. The at least one remote user equipment accesses the wireless network system by establishing a connection to the first relay user equipment. Preferably, the method is applied to the wireless network system shown in FIG. 1. The first network device may be the AS 101 in the wireless network system shown in FIG. 1, the first relay user equipment may be the relay user equipment 102 in the wireless network system shown in FIG. 1, the at least one remote user equipment may be the remote user equipment 103 in the wireless network system shown in FIG. 1, and the second network device may be the GW 104 in the wireless network system shown in FIG. 1. Referring to FIG. 4, the data flow transmission method provided in this embodiment includes the following steps.

401. The first relay user equipment establishes a connection to a remote user equipment.

The remote user equipment is a remote user equipment connected to the first relay user equipment, and there may be multiple remote user equipments.

402. The first relay user equipment sends position information of the remote user equipment to the remote user equipment.

Position information of $n^{th}$ remote user equipment in remote user equipments is used to indicate a position of the $n^{th}$ remote user equipment. In this case, because the first relay user equipment provides relay services for all the remote user equipments, the position information of the $n^{th}$ remote user equipment in the remote user equipments includes at least one of a cell ID (Identity) of a cell to which the first relay user equipment belongs, a data link layer ID of the first relay user equipment, or an IP (Internet Protocol) address of the $n^{th}$ remote user equipment. Because the remote user equipments communicate with the first network device on a network side by sharing a PDN bearer established by the relay user equipment that provides relay services for the remote user equipments, the remote user equipments for which the same relay user equipment provides relay services use a same IP address. It may be considered that same relay user equipment provides a service for remote user equipments that have a same IP address.

Optionally, when there are multiple relay user equipments in the wireless network system, each relay user equipment sends position information of the remote user equipment connected to the relay user equipment to the remote user equipment for which the relay user equipment provides a service. The position information of the remote user equipment may be an identity of a relay user equipment that provides a relay service for the remote user equipment. The identity of the relay user equipment may be any identity that can uniquely identify the relay user equipment in the wireless network system, for example, an IMSI (International Mobile Subscriber Identification Number), or an IMEI (International Mobile Equipment Identity); or may be a temporary identity allocated by the network side, for example, a GUTI (Globally Unique Temporary User Equipment Identity), an RNTI (Radio Network Temporary Identity), or a direct-communication-related identity that is used for providing information about direct communication for a user in an operator network and that is used for controlling to allocate a logical function to the user.

Optionally, the position information of the remote user equipment obtained by the remote user equipment may be sent by the relay user equipment that provides a relay service for the remote user equipment, or may be indirectly obtained in another manner. For example, the remote user equipment may obtain, in a relay user equipment discovery procedure, the identity of the relay user equipment as the position information of the remote user equipment. In this case, step 402 may not be performed.

403. The first network device obtains position information of a user equipment for which the first network device provides a service.

The first network device provides a service for at least two user equipments. The position information of the user equipment for which the first network device provides a service is used to indicate a position of the user equipment for which the first network device provides a service. Preferably, user equipments for which the first network device provides a service may include a remote user equipment, a relay user equipment, and another user equipment in a cellular network. There may be multiple relay user equipments, and the multiple relay user equipments include the first relay user equipment.

For the remote user equipment in the user equipments for which the first network device provides a service, position information of $i^{th}$ user equipment in the user equipments for which the first network device provides a service includes at least one of a cell ID of a cell to which a relay user equipment connected to the $i^{th}$ user equipment belongs, a data link layer ID of a relay user equipment connected to the $i^{th}$ user equipment, or an IP address of the $i^{th}$ user equipment. The first network device may determine, according to position information of the remote user equipment, a relay user equipment to which each remote user equipment is currently connected, and then determine remote user equipments connected to a same relay user equipment. Preferably, the position information of the $i^{th}$ user equipment includes the data link layer ID of the relay user equipment connected to the $i^{th}$ user equipment, and may further include the cell ID of the cell to which the relay user equipment connected to the $i^{th}$ user equipment belongs. It should be noted herein that the data link layer ID of the relay user equipment is used only as an example of an implementation, and the relay user equipment may be uniquely identified by using another identity. Alternatively and preferably, the position information of the $i^{th}$ user equipment includes the IP address of the $i^{th}$ user equipment.

For the relay user equipment in the user equipments for which the first network device provides a service, the first network device may determine a distribution status of the relay user equipment according to position information of the relay user equipment.

Optionally, for the remote user equipment in the user equipments for which the first network device provides a service, the first network device may obtain position information of the remote user equipment in the following two manners:

In a first manner, the remote user equipment may obtain the position information of the remote user equipment by performing step 401 and step 402 by the relay user equipment that provides a relay service for the remote user equipment, and then the relay user equipment reports the position information of the remote user equipment to the first network device. Specifically, optionally, the relay user equipment may report the position information to the first network device by means of transparent transmission.

In a second manner, the first network device obtains the position information of the remote user equipment by itself. In this case, step 401 and step 402 may not be performed.

Specifically, optionally, the first network device may determine, according to an IP address of each remote user equipment, remote user equipments connected to a same relay user equipment. Because the remote user equipment communicates with the second network device by performing network address translation by the relay user equipment, for a service, an IP address of a remote user equipment is actually an IP address of the relay user equipment. Therefore, all remote user equipments that communicate with the first network device by using a same relay user equipment may use a same IP address. The first network device may know, in such a manner, remote user equipments connected to a same relay user equipment.

404. The first network device determines a transmission manner.

Optionally, with reference to step 403, in addition to the position information sent by the remote user equipment, the first network device may receive position information (for example, position information of an LTE cell on which a user equipment currently camps) reported by some other user equipments (a user equipment directly connected to a base station) in a cellular network.

The first network device determines, according to the position information of the user equipment for which the first network device provides a service, a distribution status of the user equipment for which the first network device provides a service, and then determines the data transmission manner for sending downlink data to the user equipment. In this case, with reference to step 403, the first network device may perform determining according to a data link layer ID of a relay user equipment or an IP of a user equipment that is included in the position information of the user equipment for which the first network device provides a service. If multiple user equipments in the user equipments for which the first network device provides a service use a same data link layer ID or a same IP, it means that the multiple user equipments access the wireless network system by using a same relay user equipment, that is, the multiple user equipments are outside network coverage. The first network device may determine, according to a cell ID, the distribution status of the user equipment for which the first network device provides a service. If relatively many user equipments use a same cell ID, it means that user equipments are densely distributed in an area; or if relatively few user equipments use a same cell ID, it means that user equipments are sparsely distributed in the area.

Optionally, two modes are enumerated herein for description, and certainly, it does not mean that the present invention is limited to this.

A first mode is a multicast mode. The first network device determines a quantity of user equipments in wireless network coverage according to the position information of the user equipment for which the first network device provides a service. If the quantity of user equipments in the wireless network coverage is greater than or equal to a first threshold, the first network device determines to perform sending in an MBMS (Multimedia Broadcast Multicast Service) mode, that is, the first network device triggers the first relay user equipment to establish a multimedia broadcast/multicast service MBMS bearer with the second network device, and sends a TMGI (Temporary Mobile Group Identity) to the first relay user equipment. The TMGI is used to identify the MBMS bearer. This mode is generally applicable to a case in which there are relatively many users (especially users in a cellular network) in an area. It should be noted that if the quantity of user equipments in the wireless network coverage is greater than or equal to the first threshold, and MBMS transmission is not applicable to the wireless network because of a case such as channel congestion, data transmission may be performed in a second mode. In this case, in an LTE system, the wireless network coverage is coverage of an LTE network. The wireless network coverage is not specifically limited in the present invention. Determining performed based on the first threshold is merely an example solution of the present invention, and it does not mean that the present invention is limited to this.

A second mode is a unicast mode. If the first network device determines that a quantity of user equipments in wireless network coverage is less than a first threshold, the first network device determines a quantity of remote user equipments connected to the first relay user equipment. When the quantity of remote user equipments connected to the first relay user equipment is greater than or equal to a second threshold, the first network device determines to send data in a unicast mode, that is, the first network device triggers the first relay user equipment to establish a common data flow bearer with the second network device. The common data flow bearer is used to carry a data flow transmitted from the second network device to a remote user equipment in a first group, and the remote user equipment in the first group is connected to the second network device by using the first relay user equipment. Data carried on the common data flow bearer is downlink data sent by the first network device to the remote user equipment in the first group, that is, all remote user equipments in the first group share the data sent on the common data flow bearer, and need to obtain the downlink data from the first relay user equipment. It should be noted that if the quantity of user equipments in the wireless network coverage is greater than or equal to the first threshold, and MBMS transmission is not applicable to the wireless network because of a case such as channel congestion or excessively sparse distribution of user equipments, data transmission may be performed in the second mode.

For example, when a broadcast channel is congested, or there are relatively few user equipments in a cellular network in a broadcast area, resource waste may be caused if data is still transmitted in a broadcast mode. In this case, a unicast mode may be used. However, in a group call, one or more remote user equipments are connected to a same relay user equipment. The first network device delivers only one piece of data after the common data flow bearer is established. The relay user equipment sends the data to each remote user equipment in a unicast manner or a multicast manner after receiving the data.

When determining to transmit data in a unicast mode, the first network device triggers the relay user equipment to establish the common data flow bearer with the network side. In an example of the first relay user equipment, the data flow transmission method provided in this embodiment further includes the following steps.

405. The first relay user equipment establishes a common data flow bearer with the second network device.

Specifically, when the first network device triggers the first relay user equipment to establish the common data flow bearer with the second network device, the first relay user equipment establishes the common data flow bearer with the second network device. Optionally, a specific triggering manner may be: the first network device triggers establishment of the common data flow bearer by using an existing Rx (Receive) interface, the first network device instructs the first relay user equipment to initiate establishment of the common data flow bearer, the first network device instructs the second network device to initiate establishment of the common data flow bearer, or the first network device triggers, by using the remote user equipment, the first relay user equipment to establish the common data flow bearer.

406. The first network device sends an identifier of a common data flow to a remote user equipment in a first group.

The identifier of the common data flow is used to instruct the remote user equipment in the first group to receive data of the common data flow, and the first group includes at least two remote user equipments.

Optionally, the identifier of the common data flow may be determined by the first network device, may be sent to the first network device after being determined by the first relay user equipment, or may be negotiated by the first network device and the remote user equipment in the first group. This is not limited in the present invention.

Optionally, the identifier of the common data flow includes an IP address of a downlink data receive end, and may further include one or more of a source IP address of the common data flow, a transmit end IP address of the common data flow, a destination IP address of the common data flow, a protocol number of the common data flow, a source port of the common data flow, or a destination port of the common data flow.

In addition, optionally, a common data flow identity (flow ID) may be further used for identifying. Preferably, in an LTE system, the common data flow identity (flow ID) is an identity that is pre-negotiated by the first network device and an EPC (Evolved Packet Core) and that is dedicatedly used for identifying a downlink common data flow bearer.

Optionally, if the first network device determines the identifier of the common data flow, or the first network device negotiates with the remote user equipment to determine the identifier of the common data flow, the data flow transmission method provided in this embodiment further includes the following step:

407. The first relay user equipment obtains the identifier of the common data flow.

Preferably, the remote user equipment in the first group may send the received the identifier of the common data flow to the first relay user equipment, so that the first relay user equipment subsequently sends, in a multicast manner or a unicast manner, data received on the common data flow to the remote user equipment in the first group.

Optionally, the first relay user equipment may directly capture information exchanged between the first network device and the remote user equipment in the first group in step 406, and then determine which user equipment in remote user equipments in the first group needs to receive a data flow corresponding to the identifier of the common data flow. Because the first relay user equipment needs to transparently transmit the information exchanged between the remote user equipment and the first network device, the first relay user equipment may capture the information that needs to be transparently transmitted, so as to obtain the identifier of the common data flow.

With reference to step 404 to step 407, it should be noted that, when determining to transmit downlink data by using the common data flow in a unicast mode, the first network device may first send the identifier of the common data flow to the remote user equipment in the first group, or the first network device negotiates with each remote user equipment for the identifier of the common data flow by using an application layer.

Then, the remote user equipment in the first group triggers the first relay user equipment to establish the common data flow bearer with the second network device, or the first network device directly instructs the first relay user equipment to establish the common data flow bearer with the second network device.

It should be noted that in step 407, the first relay user equipment mainly determines remote user equipments to which the data received on the common data flow bearer is sent. In this case, optionally, in another possible implementation, the first relay user equipment directly receives an instruction including the identifier of the common data flow from the first network device.

According to the data flow transmission method provided in this embodiment of the present invention, a first network device obtains position information of a user equipment for which the first network device provides a service, and determines a transmission manner; when determining to transmit data by using a common data flow bearer in a unicast mode, the first network device triggers a first relay user equipment to establish the common data flow bearer with a second network device, and sends an identifier of a common data flow to a remote user equipment in a first group; the remote user equipment in the first group sends the identifier of the common data flow to the first relay user equipment; and when downlink data is being transmitted, the second network device transmits data of the common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

Figure 5:
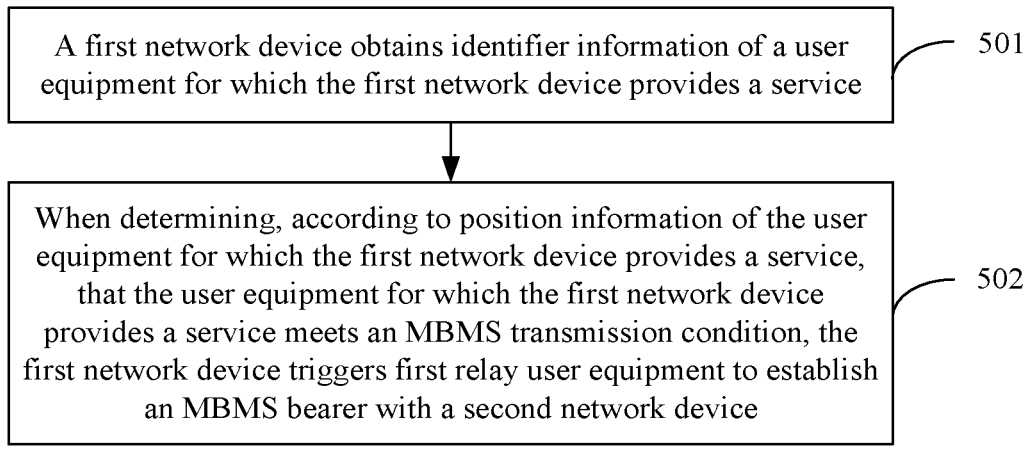
FIG. 5 is a schematic flowchart of another data flow transmission method according to an embodiment of the present invention.

With reference to the embodiments corresponding to FIG. 2, FIG. 3, and FIG. 4, an embodiment of the present invention provides another data flow transmission method. The method is applied to a first network device in a wireless network system, and is preferably applied to the wireless network system shown in FIG. 1. The first network device may be the AS 101 in the wireless network system shown in FIG. 1. Referring to FIG. 5, the method includes the following steps.

501. The first network device obtains position information of a user equipment for which the first network device provides a service.

The position information of the user equipment for which the first network device provides a service is used to indicate a position of the user equipment for which the first network device provides a service. Preferably, user equipments for which the first network device provides a service may include a remote user equipment and a relay user equipment.

For the remote user equipment in the user equipments for which the first network device provides a service, when $i^{th}$ user equipment in the user equipments for which the first network device provides a service is the remote user equipment, position information of the $i^{th}$ user equipment includes at least one of a cell ID of a cell to which a relay user equipment connected to the $i^{th}$ user equipment belongs, a data link layer ID of a relay user equipment connected to the $i^{th}$ user equipment, or an IP address of the $i^{th}$ user equipment. The first network device may determine, according to position information of the remote user equipment, a relay user equipment to which each remote user equipment is currently connected, and then determine remote user equipments connected to a same relay user equipment.

For the relay user equipment in the user equipments for which the first network device provides a service, the first network device may determine a distribution status of the relay user equipment according to position information of the relay user equipment.

502. When determining, according to the position information of the user equipment for which the first network device provides a service, that the user equipment for which the first network device provides a service meets a multimedia broadcast/multicast service MBMS transmission condition, the first network device triggers first relay user equipment to establish an MBMS bearer with a second network device.

Optionally, the first relay user equipment may be the relay user equipment 102 in the wireless network system shown in FIG. 1, a remote user equipment in a first group may be the remote user equipment 103, and the second network device may be the GW 104.

The first network device may further send a TMGI to the first relay user equipment, and the TMGI is used to identify the MBMS bearer.

Specifically, optionally, the first network device determines a quantity of user equipments in wireless network coverage according to the position information of the user equipment for which the first network device provides a service. If the quantity of user equipments in the wireless network coverage is greater than or equal to a first threshold, the first network device triggers the first relay user equipment to establish the MBMS bearer with the second network device. Certainly, determining performed based on the first threshold is merely a specific implementation provided in this embodiment of the present invention. The first network device may determine whether physical resources of the wireless network system meet the MBMS transmission condition, or if a wireless network is congested, the MBMS transmission condition is not satisfied.

Optionally, in another application scenario, when the first network device determines, according to the position information of the user equipment for which the first network device provides a service, that the user equipment for which the first network device provides a service does not meet the multimedia broadcast/multicast service MBMS transmission condition, the first network device triggers the first relay user equipment to establish a common data flow bearer with the second network device. Specifically, optionally, if the quantity of user equipments in the wireless network coverage is less than the first threshold, the first network device triggers the first relay user equipment to establish the common data flow bearer with the second network device. The common data flow bearer is used to carry a data flow transmitted from the second network device to a remote user equipment in a first group, and the first group includes at least two remote user equipments. The remote user equipment in the first group is connected to the second network device by using the first relay user equipment. Data carried on the common data flow bearer is downlink data sent by the first network device to the remote user equipment in the first group, that is, all remote user equipments in the first group need to obtain the downlink data from the first relay user equipment. It should be noted that the first network device may determine whether the wireless network is congested, and the MBMS transmission condition is not satisfied if the network is congested. In this case, the common data flow bearer may be established.

In this case, optionally, the first network device may send an identifier of a common data flow to the remote user equipment in the first group. The identifier of the common data flow is used to instruct the remote user equipment in the first group to receive data transmitted by using the common data flow bearer.

Further, optionally, the identifier of the common data flow includes an IP address of a downlink data receive end, and may further include one or more of a source IP address of the common data flow, a transmit end IP address of the common data flow, a destination IP address of the common data flow, a protocol number of the common data flow, a source port of the common data flow, or a destination port of the common data flow.

Alternatively and optionally, a common data flow identity (flow ID) may be used for identifying. Preferably, in an LTE system, the common data flow identity (flow ID) is an identity that is pre-negotiated by the first network device and an EPC (Evolved Packet Core) and that is dedicatedly used for identifying a downlink common data flow bearer.

According to the data flow transmission method provided in this embodiment of the present invention, a first network device obtains position information of a user equipment for which the first network device provides a service; and when determining, according to the position information of the user equipment, that the user equipment for which the first network device provides a service meets a multimedia broadcast/multicast service MBMS transmission condition, the first network device triggers a first relay user equipment to establish an MBMS bearer with a second network device. In this way, a problem of resource waste caused when the MBMS bearer is used to transmit data when there are relatively few user equipments in wireless network coverage or a network is congested is avoided.

Figure 6:
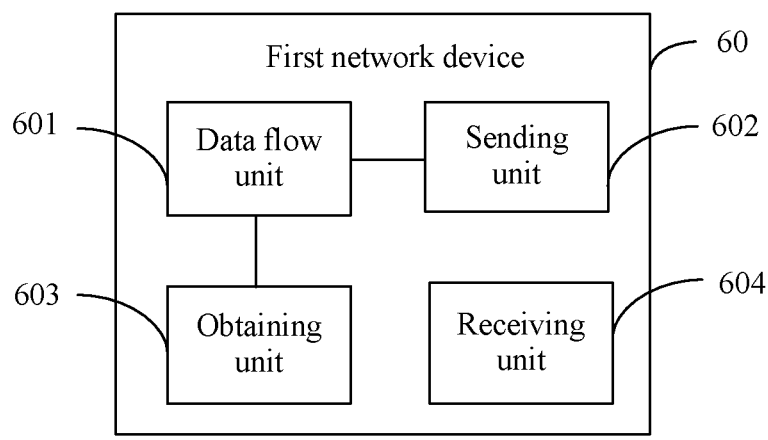
FIG. 6 is a schematic structural diagram of a first network device according to an embodiment of the present invention.

Based on the embodiments corresponding to FIG. 2 and FIG. 4, an embodiment of the present invention provides a first network device. The first network device is applied to a wireless network system, and is configured to execute the data flow transmission methods described in the embodiments corresponding to FIG. 2 and FIG. 4. Preferably, the first network device is applied to the wireless network system shown in FIG. 1, and may be the AS 101 in the network system shown in FIG. 1. Referring to FIG. 6, the first network device 60 includes a data flow unit 601 and a sending unit 602.

The data flow unit 601 is configured to trigger a first relay user equipment to establish a common data flow bearer with a second network device, where the common data flow bearer is used to carry a data flow transmitted from the second network device to a remote user equipment in a first group, and the remote user equipment in the first group is connected to the second network device by using the first relay user equipment.

The sending unit 602 is configured to send an identifier of a common data flow to the remote user equipment in the first group by using the first relay user equipment, where the identifier of the common data flow is used to instruct the remote user equipment in the first group to receive data of the common data flow, and the first group includes at least two remote user equipments.

Optionally, an application scenario is as follows:

The first network device 60 further includes an obtaining unit 603, configured to obtain position information of a user equipment for which the first network device provides a service;

the data flow unit 601 is further configured to: determine a quantity of user equipments in wireless network coverage according to the position information that is of the user equipment for which the first network device provides a service and that is obtained by the obtaining unit, and if the quantity of user equipments in the wireless network coverage is greater than or equal to a first threshold, trigger the first relay user equipment to establish a multimedia broadcast/multicast service MBMS bearer with the second network device; and the sending unit 602 is further configured to send a TMGI to the first relay user equipment.

Further, optionally, the data flow unit 601 is further configured to: when the quantity of user equipments in the wireless network coverage is less than the first threshold, determine, according to the position information of the user equipment for which the first network device provides a service, a quantity of remote user equipments connected to the first relay user equipment, and when the quantity of remote user equipments connected to the first relay user equipment is greater than or equal to a second threshold, trigger the first relay user equipment to establish the common data flow bearer with the second network device.

Optionally, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment, where i is an integer greater than or equal to 1.

Optionally, the first network device 60 further includes a receiving unit 604, configured to receive the identifier of the common data flow sent by the first relay user equipment.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

The first network device provided in this embodiment of the present invention triggers a first relay user equipment to establish a common data flow bearer with a second network device; the first network device sends an identifier of a common data flow to a remote user equipment in a first group before or after the first network device triggers the first relay user equipment to establish the common data flow bearer with the second network device; and when downlink data is being transmitted, the second network device transmits data of the common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

Figure 7:
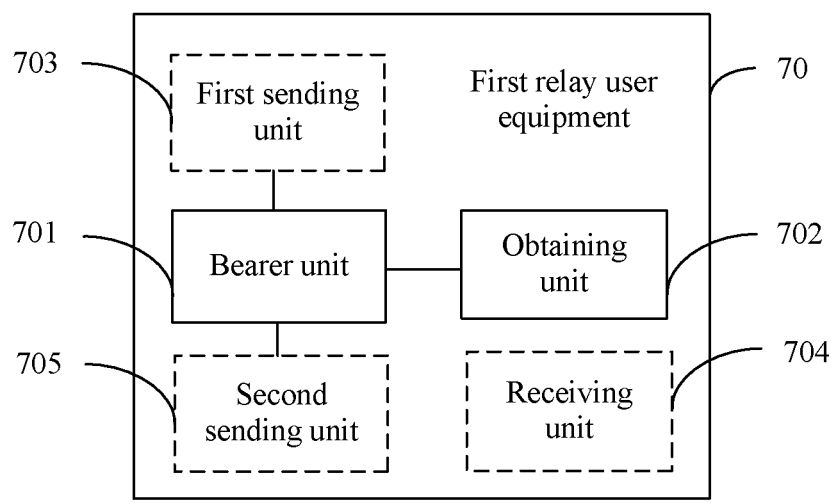
FIG. 7 is a schematic structural diagram of a first relay user equipment according to an embodiment of the present invention.

Based on the embodiments corresponding to FIG. 3 and FIG. 4, an embodiment of the present invention provides a first relay user equipment. The first relay user equipment is applied to a wireless network system, and is configured to execute the data flow transmission methods described in the embodiments corresponding to FIG. 3 and FIG. 4. Preferably, the first relay user equipment is applied to the wireless network system shown in FIG. 1, and may be the relay user equipment 102 in the network system shown in FIG. 1. Referring to FIG. 7, the first relay user equipment 70 includes a bearer unit 701 and an obtaining unit 702.

The bearer unit 701 is configured to: when a first network device triggers the first relay user equipment 70 to establish a common data flow bearer with a second network device, establish the common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

The obtaining unit 702 is configured to obtain an identifier of a common data flow before or after the first relay user equipment 70 establishes the common data flow bearer with the second network device, where the identifier of the common data flow is used to instruct the first relay user equipment 70 to send data of the common data flow to the remote user equipment in the first group.

Optionally, the first relay user equipment 70 further includes a first sending unit 703, configured to send position information of the remote user equipment to the remote user equipment, where the position information of the remote user equipment is used to indicate a position of the remote user equipment, and the remote user equipment is connected to the second network device by using the first relay user equipment.

Optionally, the bearer unit 701 is further configured to: when the first network device triggers the first relay user equipment 70 to establish a multimedia broadcast/multicast service MBMS bearer with the second network device, establish the MBMS bearer with the second network device.

The first relay user equipment 70 further includes a receiving unit 704, configured to receive a TMGI sent by the first network device.

Optionally, position information of $n^{th}$ remote user equipment in the remote user equipments includes at least one of a cell identity ID of a cell to which the first relay user equipment 70 belongs, a data link layer ID of the first relay user equipment 70, or an Internet Protocol IP address of the $n^{th}$ remote user equipment, where n is an integer greater than or equal to 1.

Optionally, the obtaining unit 702 is specifically configured to obtain the identifier of the common data flow sent by the remote user equipment in the first group.

Optionally, the first relay user equipment 70 further includes a second sending unit 705, configured to send the identifier of the common data flow to the first network device.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

The first relay user equipment provided in this embodiment of the present invention establishes a common data flow bearer with a second network device; the first relay user equipment obtains an identifier of a common data flow before or after establishing the common data flow bearer with the second network device; and when downlink data is being transmitted, the second network device transmits data of the common data flow to the first relay user equipment, and the first relay user equipment transmits the data of the common data flow to a remote user equipment in a first group. In this way, common data sent to multiple remote user equipments is transmitted only once between the first relay user equipment and the second network device, thereby resolving a problem of resource waste caused when a relay user equipment provides a relay service for a remote user equipment.

Figure 8:
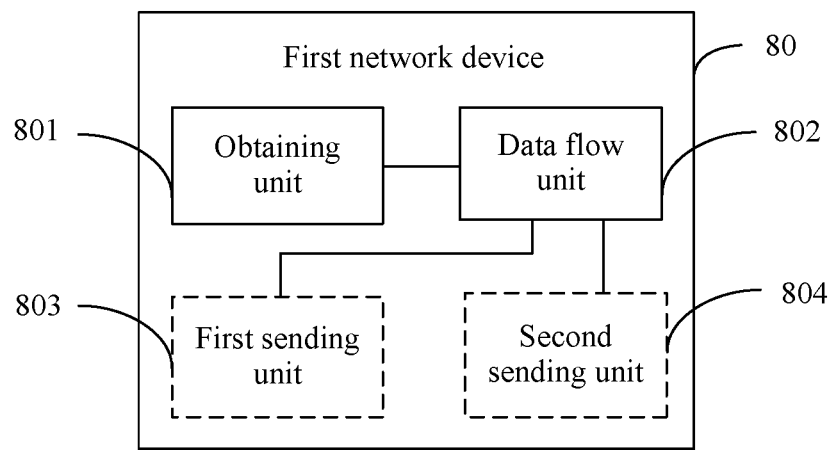
FIG. 8 is a schematic structural diagram of another first network device according to an embodiment of the present invention.

Based on the embodiment corresponding to FIG. 5, an embodiment of the present invention provides another first network device. The first network device is applied to a wireless network system, and is configured to execute the data flow transmission method described in the embodiment corresponding to FIG. 5. Preferably, the first network device is applied to the wireless network system shown in FIG. 1, and may be the AS 101 in the wireless network system shown in FIG. 1. Referring to FIG. 8, the first network device 80 includes an obtaining unit 801 and a data flow unit 802.

The obtaining unit 801 is configured to obtain position information of a user equipment for which the first network device provides a service.

The data flow unit 802 is configured to: when it is determined, according to the position information that is of the user equipment for which the first network device provides a service and that is obtained by the obtaining unit 801, that the user equipment for which the first network device provides a service meets a multimedia broadcast/multicast service MBMS transmission condition, trigger a first relay user equipment to establish an MBMS bearer with a second network device.

Optionally, the data flow unit 802 is specifically configured to: determine a quantity of user equipments in wireless network coverage according to the position information of the user equipment for which the first network device provides a service, and if the quantity of user equipments in the wireless network coverage is greater than or equal to a first threshold, trigger the first relay user equipment to establish the MBMS bearer with the second network device.

Optionally, the data flow unit 801 is further configured to: when it is determined, according to the position information of the user equipment for which the first network device provides a service, that the user equipment for which the first network device provides a service does not meet the multimedia broadcast/multicast service MBMS transmission condition, trigger the first relay user equipment to establish a common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

Optionally, the first network device 80 further includes a first sending unit 803, configured to send an identifier of a common data flow to the remote user equipment in the first group when it is determined, according to the position information of the user equipment for which the first network device provides a service, that the user equipment for which the first network device provides a service does not meet the multimedia broadcast/multicast service MBMS transmission condition, where the identifier of the common data flow is used to instruct the remote user equipment in the first group to receive data of the common data flow.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

Optionally, the first network device 80 further includes a second sending unit 804, configured to send a TMGI to the first relay user equipment.

Optionally, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment.

The first network device provided in this embodiment of the present invention obtains position information of a user equipment for which the first network device provides a service, and when determining, according to the position information of the user equipment for which the first network device provides a service, that the user equipment for which the first network device provides a service meets a multimedia broadcast/multicast service MBMS transmission condition, triggers a first relay user equipment to establish an MBMS bearer with a second network device. In this way, a problem of resource waste caused when the MBMS bearer is used to transmit data when there are relatively few user equipments in wireless network coverage or a network is congested is avoided.

Figure 9:
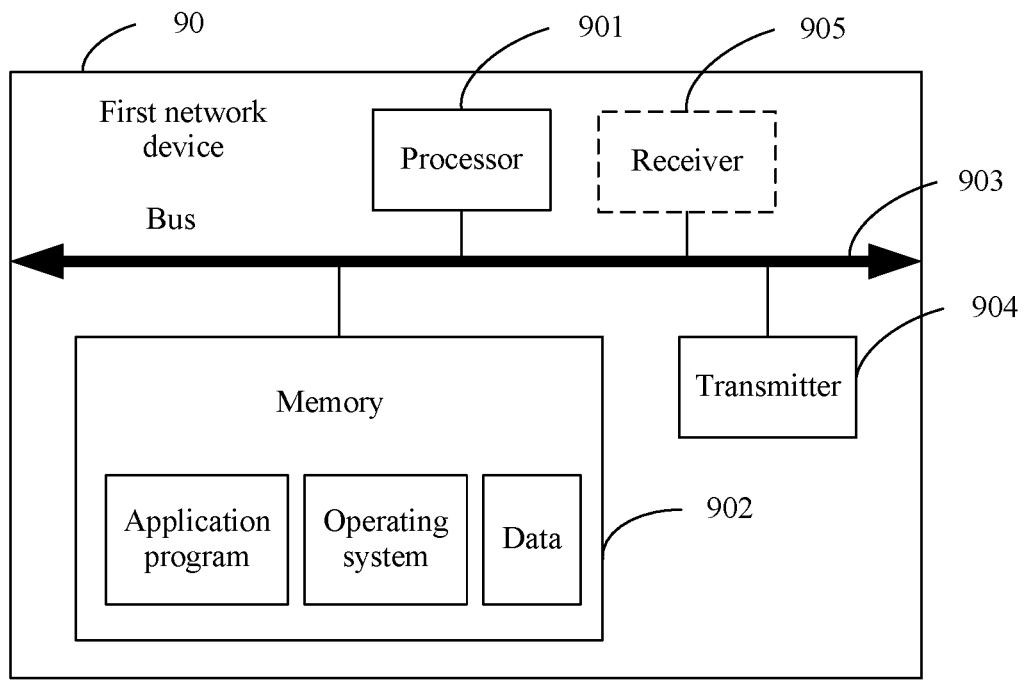
FIG. 9 is a schematic structural diagram of a first network device according to another embodiment of the present invention.

Based on the embodiments corresponding to FIG. 2 and FIG. 4, another embodiment of the present invention provides a first network device 90. The first network device is applied to a wireless network system, and is configured to execute the data flow transmission methods described in the embodiments corresponding to FIG. 2 and FIG. 4. Preferably, the first network device is applied to the wireless network system shown in FIG. 1, and may be the AS 101 in the network system shown in FIG. 1. Referring to FIG. 9, the first network device 90 includes: at least one processor 901, a memory 902, a bus 903, and a transmitter 904, and the at least one processor 901, the memory 902, and the transmitter 904 are connected to and communicate with each other by using the bus 903.

The bus 903 may be an ISA (Industry Standard Architecture) bus, a PCI (peripheral component interconnect) bus, an EISA (Extended Industry Standard Architecture) bus, or the like. The bus 903 may include an address bus, a data bus, a control bus, and the like. For ease of denotation, the bus 903 is represented by using only one thick line in FIG. 9. However, it does not mean that there is only one bus or only one type of bus.

The memory 902 is configured to store application program code used for executing the solutions of the present invention. The application program code used for executing the solutions of the present invention is stored in the memory, and execution thereof is controlled by the processor 901.

The memory may be a read-only memory ROM or a static storage device of another type that can store static information and an instruction, or a random access memory RAM or a dynamic storage device of another type that can store information and an instruction; or may be an electrically erasable programmable read-only memory EEPROM, a compact disc read-only memory CD-ROM, another compact disk storage medium, an optical disc storage medium (including a compact disc, a laser disc, an optical disc, a digital versatile disc, a blue-ray disc, and the like), or a disk storage medium, another disk storage device, or any other medium that can be used to carry or store expected program code in a form of an instruction or a data structure and that can be accessed by a computer. The memory is not limited herein. These memories are connected to the processor by using the bus.

The processor 901 may be a central processing unit 901 (CPU for short), an application-specific integrated circuit (ASIC for short), or one or more integrated circuits configured to implement this embodiment of the present invention.

The processor 901 is configured to invoke the program code stored in the memory 902. In a possible implementation, the following functions are implemented when the foregoing application program code is executed by the processor 901.

The processor 901 is configured to trigger a first relay user equipment to establish a common data flow bearer with a second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

The transmitter 904 is configured to send an identifier of a common data flow to the remote user equipment in the first group by using the first relay user equipment, where the identifier of the common data flow is used to instruct the remote user equipment in the first group to receive data of the common data flow.

Optionally, the processor 901 is further configured to: obtain position information of a user equipment for which the first network device provides a service, determine a quantity of user equipments in wireless network coverage according to the position information of the user equipment for which the first network device provides a service, and if the quantity of user equipments in the wireless network coverage is greater than or equal to a first threshold, trigger the first relay user equipment to establish a multimedia broadcast/multicast service MBMS bearer with the second network device.

The transmitter 904 is further configured to send a TMGI to the first relay user equipment.

Optionally, the processor 901 is further configured to: when the quantity of user equipments in the wireless network coverage is less than the first threshold, determine, according to the position information of the user equipment for which the first network device provides a service, a quantity of remote user equipments connected to the first relay user equipment, and when the quantity of remote user equipments connected to the first relay user equipment is greater than or equal to a second threshold, trigger the first relay user equipment to establish the common data flow bearer with the second network device.

Optionally, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment, where i is an integer greater than or equal to 1.

Optionally, the first network device 90 further includes a receiver 905, configured to receive the identifier of the common data flow sent by the first relay user equipment.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

The first network device provided in this embodiment of the present invention triggers a first relay user equipment to establish a common data flow bearer with a second network device; the first network device sends an identifier of a common data flow to a remote user equipment in a first group before or after the first network device triggers the first relay user equipment to establish the common data flow bearer with the second network device; and when downlink data is being transmitted, the second network device transmits data of the common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

Figure 10:
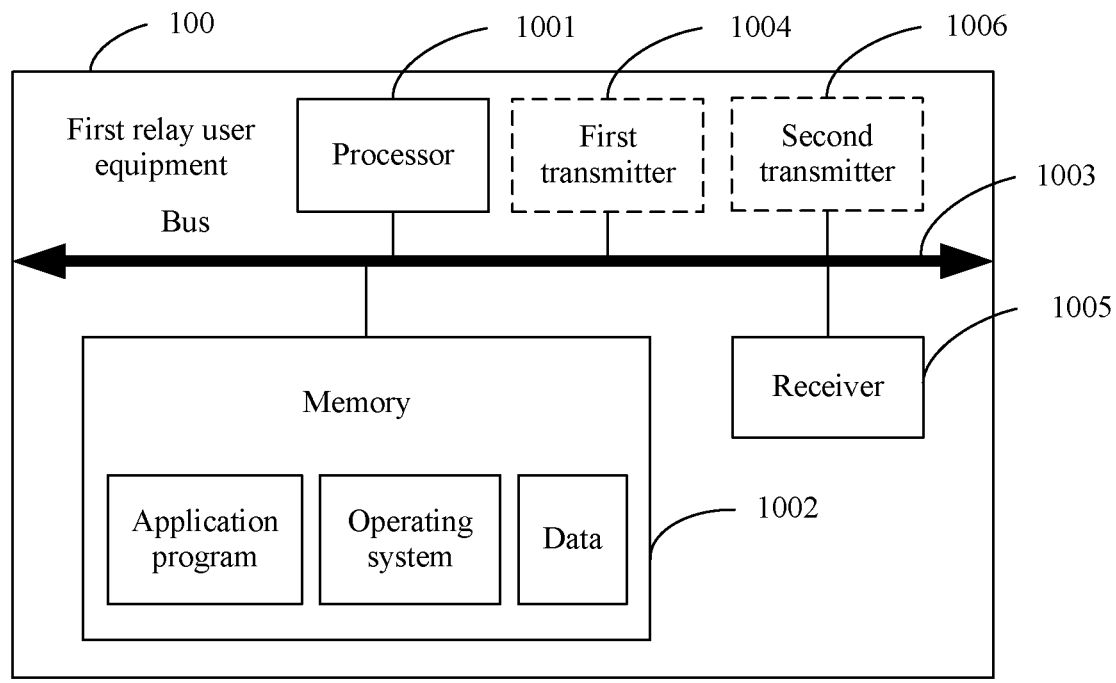
FIG. 10 is a schematic structural diagram of a first relay user equipment according to another embodiment of the present invention.

Based on the embodiments corresponding to FIG. 3 and FIG. 4, another embodiment of the present invention provides a first relay user equipment. The first relay user equipment is applied to a wireless network system, and is configured to execute the data flow transmission methods described in the embodiments corresponding to FIG. 3 and FIG. 4. Preferably, the first relay user equipment is applied to the wireless network system shown in FIG. 1, and may be the relay user equipment 102 in the network system shown in FIG. 1. Referring to FIG. 10, the first relay user equipment 100 includes: at least one processor 1001, a memory 1002, and a bus 1003, and the at least one processor 1001 and the memory 1002 are connected to and communicate with each other by using the bus 1003.

The bus 1003 may be an ISA (Industry Standard Architecture) bus, a PCI (peripheral component interconnect) bus, an EISA (Extended Industry Standard Architecture) bus, or the like. The bus 1003 may include an address bus, a data bus, a control bus, and the like. For ease of denotation, the bus 1003 is represented by using only one thick line in FIG. 10. However, it does not mean that there is only one bus or only one type of bus.

The memory 1002 is configured to store application program code used for executing the solutions of the present invention. The application program code used for executing the solutions of the present invention is stored in the memory, and execution thereof is controlled by the processor 1001.

The memory may be a read-only memory ROM or a static storage device of another type that can store static information and an instruction, or a random access memory RAM or a dynamic storage device of another type that can store information and an instruction; or may be an electrically erasable programmable read-only memory EEPROM, a compact disc read-only memory CD-ROM, another compact disk storage medium, an optical disc storage medium (including a compact disc, a laser disc, an optical disc, a digital versatile disc, a blue-ray disc, and the like), or a disk storage medium, another disk storage device, or any other medium that can be used to carry or store expected program code in a form of an instruction or a data structure and that can be accessed by a computer. The memory is not limited herein. These memories are connected to the processor by using the bus.

The processor 1001 may be a central processing unit 1001 (CPU for short), an application-specific integrated circuit (ASIC for short), or one or more integrated circuits configured to implement this embodiment of the present invention.

The processor 1001 is configured to invoke the program code stored in the memory 1002. In a possible implementation, the following functions are implemented when the foregoing application program is executed by the processor 1001.

The processor 1001 is configured to: when a first network device triggers the first relay user equipment to establish a common data flow bearer with a second network device, establish the common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

The processor 1001 is further configured to obtain an identifier of a common data flow before or after the first relay user equipment establishes the common data flow bearer with the second network device, where the identifier of the common data flow is used to instruct the first relay user equipment to send data of the common data flow to the remote user equipment in the first group.

Optionally, the first relay user equipment 100 further includes a first transmitter 1004, configured to send position information of the remote user equipment to the remote user equipment, where the position information of the remote user equipment is used to indicate a position of the remote user equipment, and the remote user equipment is connected to the second network device by using the first relay user equipment.

Optionally, the processor 1001 is further configured to: when the first network device triggers the first relay user equipment to establish a multimedia broadcast/multicast service MBMS bearer with the second network device, establish the MBMS bearer with the second network device.

The first relay user equipment 100 further includes a receiver 1005, configured to receive a TMGI sent by the first network device.

Optionally, position information of $n^{th}$ remote user equipment in the remote user equipments includes at least one of a cell identity ID of a cell to which the first relay user equipment belongs, a data link layer ID of the first relay user equipment, or an Internet Protocol IP address of the $n^{th}$ remote user equipment, where n is an integer greater than or equal to 1.

Optionally, the processor 1001 is specifically configured to obtain the identifier of the common data flow sent by the remote user equipment in the first group.

Optionally, the first relay user equipment 100 further includes a second transmitter 1006, configured to send the identifier of the common data flow to the first network device.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

The first relay user equipment provided in this embodiment of the present invention establishes a common data flow bearer with a second network device; the first relay user equipment obtains an identifier of a common data flow before or after establishing the common data flow bearer with the second network device; and when downlink data is being transmitted, the second network device transmits data of the common data flow to the first relay user equipment, and the first relay user equipment transmits the data of the common data flow to a remote user equipment in a first group. In this way, common data sent to multiple remote user equipments is transmitted only once between the first relay user equipment and the second network device, thereby resolving a problem of resource waste caused when a relay user equipment provides a relay service for a remote user equipment.

Figure 11:
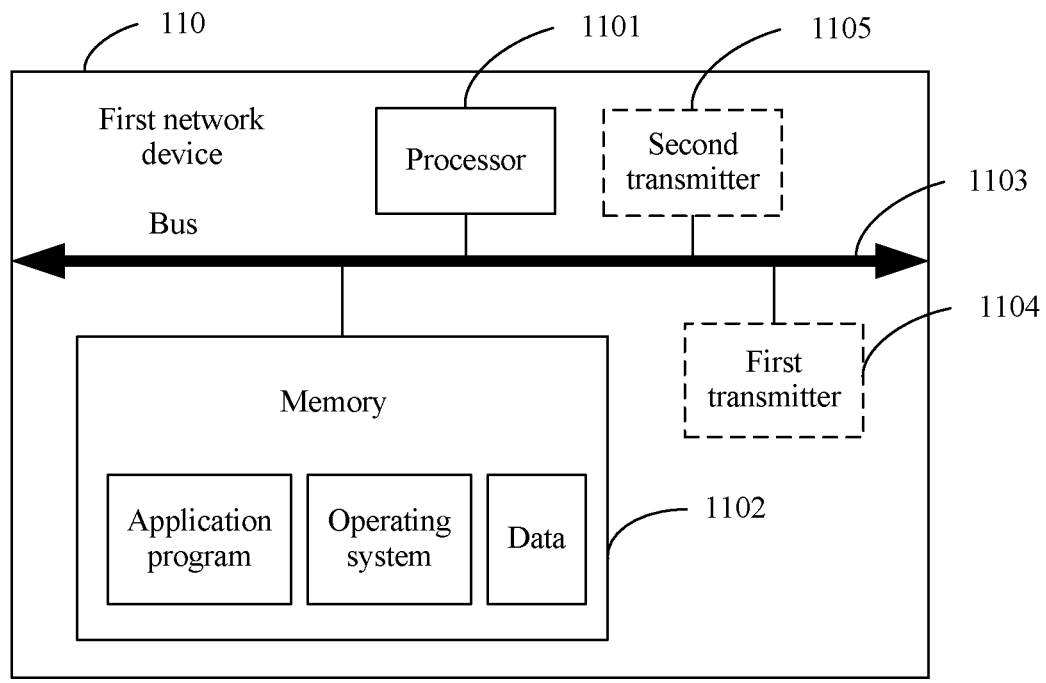
FIG. 11 is a schematic structural diagram of another first network device according to another embodiment of the present invention.

Based on the embodiment corresponding to FIG. 5, another embodiment of the present invention provides another first network device. The first network device is applied to a wireless network system, and is configured to execute the data flow transmission method described in the embodiment corresponding to FIG. 5. Preferably, the first network device is applied to the wireless network system shown in FIG. 1, and may be the AS 101 in the wireless network system shown in FIG. 1. Referring to FIG. 11, the first network device 110 includes: at least one processor 1101, a memory 1102, and a bus 1103, and the at least one processor 1101 and the memory 1102 are connected to and communicate with each other by using the bus 1103.

The bus 1103 may be an ISA (Industry Standard Architecture) bus, a PCI (peripheral component interconnect) bus, an EISA (Extended Industry Standard Architecture) bus, or the like. The bus 1103 may include an address bus, a data bus, a control bus, and the like. For ease of denotation, the bus 1103 is represented by using only one thick line in FIG. 11. However, it does not mean that there is only one bus or only one type of bus.

The memory 1102 is configured to store application program code used for executing the solutions of the present invention. The application program code used for executing the solutions of the present invention is stored in the memory, and execution thereof is controlled by the processor 1101.

The memory may be a read-only memory ROM or a static storage device of another type that can store static information and an instruction, or a random access memory RAM or a dynamic storage device of another type that can store information and an instruction; or may be an electrically erasable programmable read-only memory EEPROM, a compact disc read-only memory CD-ROM, another compact disk storage medium, an optical disc storage medium (including a compact disc, a laser disc, an optical disc, a digital versatile disc, a blue-ray disc, and the like), or a disk storage medium, another disk storage device, or any other medium that can be used to carry or store expected program code in a form of an instruction or a data structure and that can be accessed by a computer. The memory is not limited herein. These memories are connected to the processor by using the bus.

The processor 1101 may be a central processing unit 1101 (CPU for short), an application-specific integrated circuit (ASIC for short), or one or more integrated circuits configured to implement this embodiment of the present invention.

The processor 1101 is configured to invoke the program code stored in the memory 1102. In a possible implementation, the following functions are implemented when the foregoing application program is executed by the processor 1101.

The processor 1101 is configured to: obtain position information of a user equipment for which the first network device provides a service, and when it is determined, according to the position information of the user equipment for which the first network device provides a service, that the user equipment for which the first network device provides a service meets a multimedia broadcast/multicast service MBMS transmission condition, trigger a first relay user equipment to establish an MBMS bearer with a second network device.

Optionally, the processor 1101 is specifically configured to: determine a quantity of user equipments in wireless network coverage according to the position information of the user equipment for which the first network device provides a service, and if the quantity of user equipments in the wireless network coverage is greater than or equal to a first threshold, trigger the first relay user equipment to establish the MBMS bearer with the second network device.

Optionally, the processor 1101 is further configured to: when it is determined, according to the position information of the user equipment for which the first network device provides a service, that the user equipment for which the first network device provides a service does not meet the multimedia broadcast/multicast service MBMS transmission condition, trigger the first relay user equipment to establish a common data flow bearer with the second network device, where the common data flow bearer is used to carry a data flow transmitted from the second network device to a remote user equipment in a first group, the remote user equipment in the first group is connected to the second network device by using the first relay user equipment, and the first group includes at least two remote user equipments.

Optionally, the first network device 110 further includes a first transmitter 1104, configured to send an identifier of a common data flow to the remote user equipment in the first group when it is determined, according to the position information of the user equipment for which the first network device provides a service, that the user equipment for which the first network device provides a service does not meet the multimedia broadcast/multicast service MBMS transmission condition, where the identifier of the common data flow is used to instruct the remote user equipment in the first group to receive data of the common data flow.

Optionally, the identifier of the common data flow includes an IP address of a downlink data receive end.

The identifier of the common data flow further includes at least one of a source IP address of the common data flow, a destination IP address of the common data flow, a protocol number of the common data flow, a source port of the common data flow, a destination port of the common data flow, or an ID of the common data flow.

Optionally, the first network device 110 further includes a second transmitter 1105, configured to send a TMGI to the first relay user equipment.

Optionally, position information of $i^{th}$ user equipment in user equipments for which the first network device provides a service includes at least one of a cell identity ID of a cell to which a relay user equipment connected to the $i^{th}$ user equipment belongs, a data link layer ID of a relay user equipment connected to the $i^{th}$ user equipment, or an Internet Protocol IP address of the $i^{th}$ user equipment.

The first network device provided in this embodiment of the present invention obtains position information of a user equipment for which the first network device provides a service, and when determining, according to the position information of the user equipment for which the first network device provides a service, that the user equipment for which the first network device provides a service meets a multimedia broadcast/multicast service MBMS transmission condition, triggers a first relay user equipment to establish an MBMS bearer with a second network device. In this way, a problem of resource waste caused when the MBMS bearer is used to transmit data when there are relatively few user equipments in wireless network coverage or a network is congested is avoided.

Figure 12:
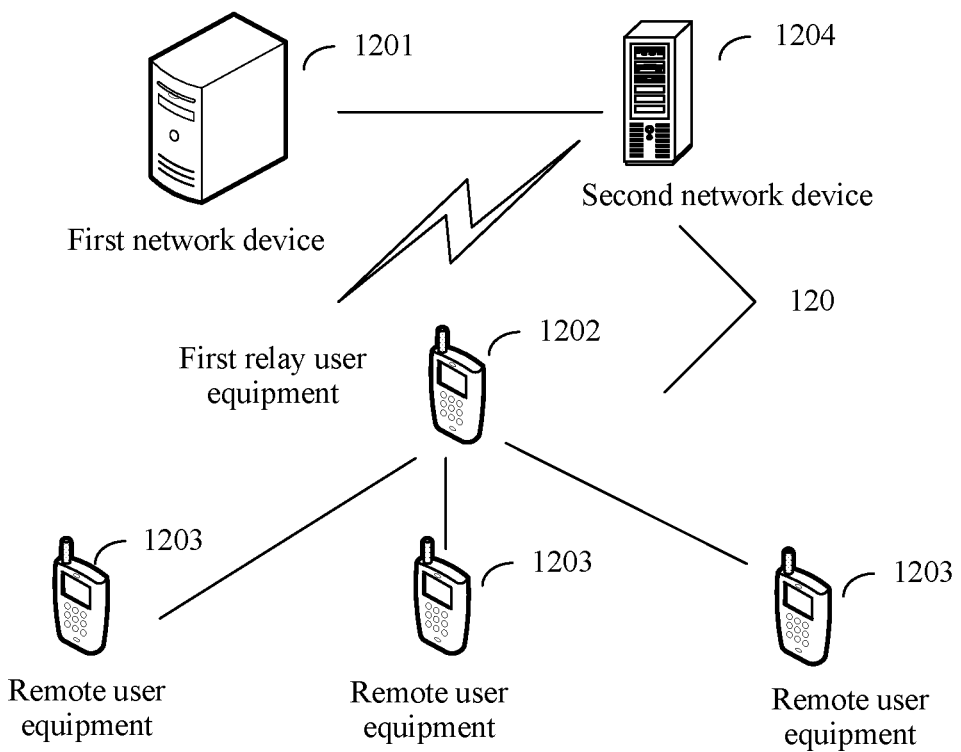
FIG. 12 is a schematic structural diagram of a wireless network system according to another embodiment of the present invention.

Another embodiment of the present invention provides a wireless network system, configured to execute the data flow transmission methods described in the embodiments corresponding to FIG. 2, FIG. 3, and FIG. 4. Preferably, the wireless network system provided in this embodiment may be the wireless network system shown in FIG. 1. Referring to FIG. 12, a wireless network system 120 provided in this embodiment includes a first network device 1201 and a first relay user equipment 1202.

The first network device 1201 is the first network device described in the embodiment corresponding to FIG. 6, and the first relay user equipment 1202 is the first relay user equipment described in the embodiment corresponding to FIG. 7.

Alternatively, the first network device 1201 is the first network device described in the embodiment corresponding to FIG. 9, and the first relay user equipment 1202 is the first relay user equipment described in the embodiment corresponding to FIG. 10.

Optionally, the wireless network system 120 further includes a remote user equipment 1203 and a second network device 1204.

According to the wireless network system provided in this embodiment of the present invention, a first network device triggers a first relay user equipment to establish a common data flow bearer with a second network device; the first network device sends an identifier of a common data flow to a remote user equipment in a first group before or after the first network device triggers the first relay user equipment to establish the common data flow bearer with the second network device; and when downlink data is being transmitted, the second network device transmits data of the common data flow to the first relay user equipment, and the first relay user equipment transmits the data of the common data flow to the remote user equipment in the first group. In this way, common data sent to multiple remote user equipments is transmitted only once between the first relay user equipment and the second network device, thereby resolving a problem of resource waste caused when a relay user equipment provides a relay service for a remote user equipment.

Figure 13:
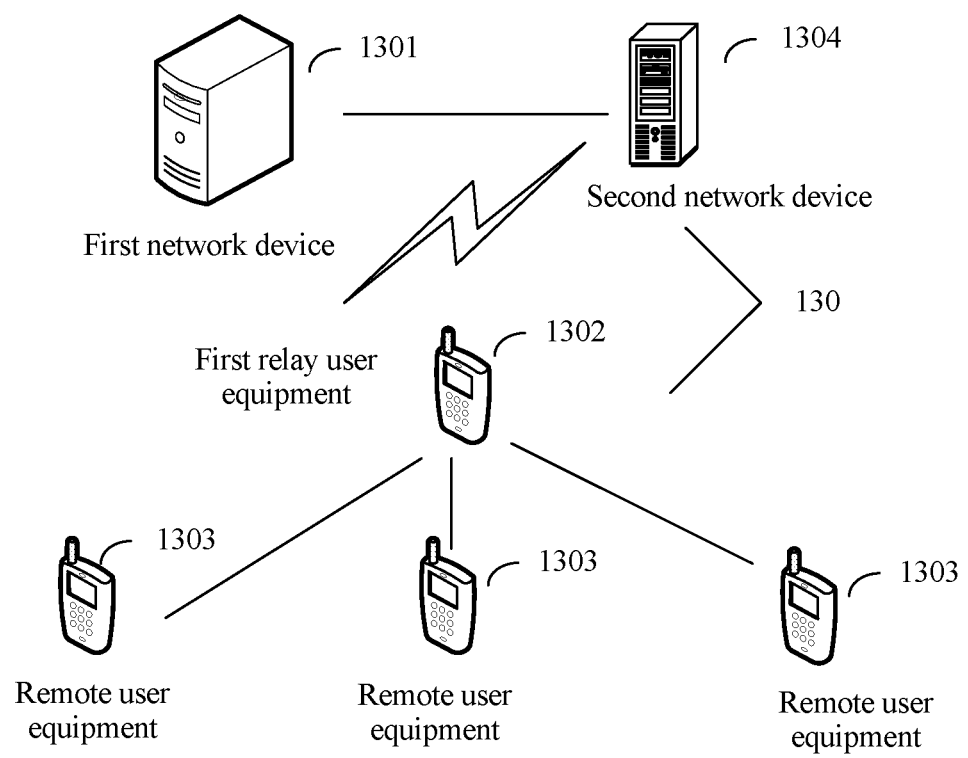
FIG. 13 is a schematic structural diagram of a wireless network system according to still another embodiment of the present invention.

Still another embodiment of the present invention provides a wireless network system, configured to execute the data flow transmission method described in the embodiment corresponding to FIG. 5. Preferably, the wireless network system provided in this embodiment may be the wireless network system shown in FIG. 1. Referring to FIG. 13, a wireless network system 130 provided in this embodiment includes a first network device 1301.

The first network device 1301 is the first network device described in the embodiment corresponding to FIG. 8, or the first network device 1301 is the first network device described in the embodiment corresponding to FIG. 11.

Optionally, the wireless network system 130 further includes a first relay user equipment 1302, a remote user equipment 1303, and a second network device 1304.

According to the wireless network system provided in this embodiment of the present invention, a first network device obtains position information of a user equipment for which the first network device provides a service; and when determining, according to the position information of the user equipment for which the first network device provides a service, that the user equipment for which the first network device provides a service meets a multimedia broadcast/multicast service MBMS transmission condition, the first network device triggers a first relay user equipment to establish an MBMS bearer with a second network device. In this way, a problem of resource waste caused when the MBMS bearer is used to transmit data when there are relatively few user equipments in wireless network coverage or a network is congested is avoided.

Based on descriptions of the foregoing implementations, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer readable medium may include a RAM (Random Access Memory), a ROM (Read-Only Memory), an EEPROM (Electrically Erasable Programmable Read-Only Memory), a CD-ROM (Compact Disc Read-Only Memory), another optical disk storage medium, a disk storage medium, another disk storage device, or any other medium that can be used to carry or store expected program code in a form of an instruction or a data structure and that can be accessed by a computer. In addition, any connection may be appropriately defined as a computer-readable medium. For example, if software is transmitted from a web site, a first network device, or another remote source by using a coaxial cable, an optical fiber/cable, a twisted pair, a DSL (Digital Subscriber Line), or wireless technologies such as infrared ray, radio and microwave, the coaxial cable, the optical fiber/cable, the twisted pair, the DSL or the wireless technologies such as infrared ray, radio and microwave are included in a definition of a medium to which they belong. For example, a disk and a disc used in the present invention includes a CD (Compact Disc), a laser disc, an optical disc, a DVD disc (Digital Versatile Disc), a floppy disk, and a Blu-ray disc, and the disk generally copies data by a magnetic means, and the disc copies data optically by a laser means. The foregoing combination should also be included in the protection scope of the computer-readable medium.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data flow transmission method, applied to a wireless network system, the method comprising:
   obtaining, by a first network device, position information of a user equipment for which the first network device provides a service;
   determining, by the first network device according to the position information, a quantity of remote user equipments in a first group connected to a relay user equipment;
   in response to the quantity of the remote user equipments in the first group connected to the relay user equipment being greater than or equal to a second threshold, determining, by the first network device, to send data of the remote user equipments using a common data flow bearer in a unicast mode;
   triggering, by the first network device, the relay user equipment to establish the common data flow bearer with a second network device, wherein the common data flow bearer is used to carry a data flow transmitted from the second network device to a remote user equipment in the first group, and the remote user equipment in the first group is connected to the second network device by using the relay user equipment; and
   sending, by the first network device, an identifier of a common data flow to the remote user equipment in the first group by using the relay user equipment, wherein the identifier of the common data flow is used for the remote user equipment in the first group receiving data of the common data flow, and the common data flow is the data flow transmitted from the second network device to the remote user equipment in the first group.

2. The method according to claim 1, wherein before the sending, by the first network device, the identifier of the common data flow to the remote user equipment in the first group, the method further comprises:
   receiving, by the first network device, the identifier of the common data flow from the relay user equipment.

3. The method according to claim 1, wherein:
   the identifier of the common data flow comprises an IP address of a downlink data receive end; and
   the identifier of the common data flow further comprises at least one of a source IP address of the common data flow, a destination IP address of the common data flow, a protocol number of the common data flow, a source port of the common data flow, or a destination port of the common data flow.

4. An apparatus of a wireless network system, the apparatus comprising:
   a processor; and
   a memory storing instructions that when executed configure the processor to perform steps comprising:

obtaining position information of a user equipment for which the first network device provides a service;

determining, according to the position information, a quantity of remote user equipments in a first group connected to a relay user equipment;

in response to the quantity of the remote user equipments in the first group connected to the relay user equipment being greater than or equal to a second threshold, determining to send data of the remote user equipments using a common data flow bearer in a unicast mode;

triggering the relay user equipment to establish the common data flow bearer with a second network device, wherein the common data flow bearer is used to carry a data flow transmitted from the second network device to a remote user equipment in the first group, and the remote user equipment in the first group is connected to the second network device by using the relay user equipment; and sending an identifier of a common data flow to the remote user equipment in the first group by using the relay user equipment, wherein the identifier of the common data flow is used for the remote user equipment in the first group receiving data of the common data flow, and the common data flow is the data flow transmitted from the second network device to the remote user equipment in the first group.

5. The apparatus according to claim 4, wherein before the sending the identifier of the common data flow to the remote user equipment in the first group, the method further comprises:

receiving the identifier of the common data flow from the relay user equipment.

6. The apparatus according to claim 4, wherein:

the identifier of the common data flow comprises an IP address of a downlink data receive end; and the identifier of the common data flow further comprises at least one of a source IP address of the common data flow, a destination IP address of the common data flow, a protocol number of the common data flow, a source port of the common data flow, or a destination port of the common data flow.

7. A non-transitory computer readable medium storing instructions for performing data flow transmission in a wireless network system, the instructions, when executed by a computer, configure the computer to perform steps comprising:

obtaining, by a first network device, position information of a user equipment for which the first network device provides a service;

determining, by the first network device according to the position information, a quantity of remote user equipments in a first group connected to a relay user equipment;

in response to the quantity of the remote user equipments in the first group connected to the relay user equipment being greater than or equal to a second threshold, determining, by the first network device, to send data of the remote user equipments using a common data flow bearer in a unicast mode;

triggering, by the first network device, the relay user equipment to establish the common data flow bearer with a second network device, wherein the common data flow bearer is used to carry a data flow transmitted from the second network device to a remote user equipment in the first group, and the remote user equipment in the first group is connected to the second network device by using the relay user equipment; and sending, by the first network device, an identifier of a common data flow to the remote user equipment in the first group by using the relay user equipment, wherein the identifier of the common data flow is used for the remote user equipment in the first group receiving data of the common data flow, and the common data flow is the data flow transmitted from the second network device to the remote user equipment in the first group.

8. The non-transitory computer readable medium according to claim 7, wherein before the sending, by the first network device, the identifier of the common data flow to the remote user equipment in the first group, the method further comprises:

receiving, by the first network device, the identifier of the common data flow from the relay user equipment.

9. The non-transitory computer readable medium according to claim 7, wherein:

the identifier of the common data flow comprises an IP address of a downlink data receive end; and the identifier of the common data flow further comprises at least one of a source IP address of the common data flow, a destination IP address of the common data flow, a protocol number of the common data flow, a source port of the common data flow, or a destination port of the common data flow.

* * * * *